US009537679B2

(12) United States Patent
Nowick et al.

(10) Patent No.: US 9,537,679 B2
(45) Date of Patent: Jan. 3, 2017

(54) BI-MODAL ARBITRATION NODES FOR A LOW-LATENCY ADAPTIVE ASYNCHRONOUS INTERCONNECTION NETWORK AND METHODS FOR USING THE SAME

(75) Inventors: Steven M. Nowick, Leonia, NJ (US); Gennette Delaine Gill, Pelham, NY (US); Sumedh S. Attarde, Pune (IN)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 14/004,870

(22) PCT Filed: Mar. 14, 2012

(86) PCT No.: PCT/US2012/029069
§ 371 (c)(1),
(2), (4) Date: Apr. 16, 2014

(87) PCT Pub. No.: WO2012/125718
PCT Pub. Date: Sep. 20, 2012

(65) Prior Publication Data
US 2014/0241443 A1     Aug. 28, 2014

Related U.S. Application Data

(60) Provisional application No. 61/453,437, filed on Mar. 16, 2011.

(51) Int. Cl.
*H04L 27/00* (2006.01)
*H04L 25/03* (2006.01)
*G06F 13/14* (2006.01)

(52) U.S. Cl.
CPC ............... *H04L 25/03* (2013.01); *G06F 13/14* (2013.01)

(58) Field of Classification Search
CPC .......... H04L 25/03; H04L 12/56; H04L 12/42; G06F 13/00; G06F 13/14
(Continued)

(56) References Cited

U.S. PATENT DOCUMENTS 5,574,782 A * 11/1996 Baird .................... H04M 3/523
379/221.09
2002/0075828 A1 * 6/2002 Jang .................... H04Q 11/0478
370/331
(Continued)

OTHER PUBLICATIONS

International Search Report of International Application No. PCT/US2012/029069, dated Jun. 13, 2012.

*Primary Examiner* — Syed Haider
(74) *Attorney, Agent, or Firm* — Wilmer Cutler Pickering Hale and Dorr LLP

(57) ABSTRACT

A dynamically reconfigurable asynchronous arbitration node for use in an adaptive asynchronous interconnection network is provided. The arbitration node includes a circuit, an output channel and two input channels—a first input channel and a second input channel. The circuit supports a default-arbitration mode and a biased-input mode. The circuit is configured to generate data for the output channel by mediating between input traffic including data received at the first and second input channels, if the arbitration node is operating in the default-arbitration mode, or by providing a direct path to the output channel for one of the first input channel and the second input channel that is biased, if the arbitration node is operating in the biased-input mode. The circuit is further configured to monitor the input traffic and implement a mode change based on a history of the observed input traffic in accordance with a mode-change policy.

26 Claims, 13 Drawing Sheets

(58) Field of Classification Search
USPC .......................................... 375/259, 316, 345
See application file for complete search history.

(56) References Cited

U.S. PATENT DOCUMENTS

| | | |
|---|---|---|
| 2005/0135404 A1* | 6/2005 | Zumsteg et al. .............. 370/442 |
| 2006/0203825 A1* | 9/2006 | Beigne et al. ........... 370/395.42 |
| 2006/0209846 A1 | 9/2006 | Clermidy et al. |
| 2009/0086653 A1* | 4/2009 | Driscoll ................ H04L 12/437 370/258 |

* cited by examiner

BI-MODAL ARBITRATION NODES FOR A LOW-LATENCY ADAPTIVE ASYNCHRONOUS INTERCONNECTION NETWORK AND METHODS FOR USING THE SAME

RELATED APPLICATION

This application claims the benefit of PCT/US2012/029069, filed on Mar. 14, 2012, which claims the benefit under 35 U.S.C. §119(e) of U.S. Provisional Patent Application No. 61/453,437, filed Mar. 16, 2011, which is hereby expressly incorporated by reference herein in its entirety.

STATEMENT REGARDING FEDERALLY SPONSORED RESEARCH OR DEVELOPMENT

The government may have certain rights in the present invention pursuant to grants from the NSF award CCF-0811504.

TECHNICAL FIELD

The disclosed subject matter relates to asynchronous digital circuits and circuit components, including arbitration nodes and routing nodes, for asynchronous and mixed-timing networks and networks-on-chip (NOCs).

BACKGROUND

Developments in networks-on-chip (NOCs) in the last decade have demonstrated great promise in handling several of the key challenges facing digital system designers in the deep submicron era, including design time, scalability, reliability and ease-of-integration. However, recent findings still predict significant challenges and short-comings in terms of system latency, throughput and power consumption.

One approach that has been explored to address such challenges is elimination of the global clock, either using entirely asynchronous systems or integrating synchronous cores, nodes and memories through asynchronous communication in a globally-asynchronous locally synchronous (GALS) system. GALS systems offer the potential of more flexible integration of heterogeneous components, such as heterochronous systems that have arbitrary unrelated clock domains.

A number of recent approaches have also been explored for dynamic adaptivity in both synchronous and asynchronous domains. These approaches include asynchronous dynamic leakage management and synchronization reduction in multi-synchronous NOCs as well as other synchronous approaches, including express virtual channels.

SUMMARY

Some of the embodiments of the disclosed subject matter provide bi-modal arbitration nodes for asynchronous interconnection network for dynamic adaptivity. Such bi-modal arbitration nodes can, among other things, reduce system latency without incurring high overhead by observing their recent local traffic pattern and rapidly entering and leaving a special biased mode that allows an uncontended cut-through path. Effectively, arbitration is bypassed for transient or persistent periods where only one input channel becomes active.

In one embodiment, a dynamically reconfigurable asynchronous arbitration node for use in an adaptive asynchronous interconnection network is provided. The arbitration node includes a circuit and at least one output channel and a plurality of input channels, including a first input channel and a second input channel. The circuit can support a plurality of operating modes for the arbitration node including a default-arbitration mode and a biased-input mode. The circuit is configured to generate data for the at least one output channel by mediating amongst input traffic including data received at the first input channel and data received at the second input channel, if the arbitration node is operating in the default-arbitration mode, or by providing a direct path to the at least one output channel for one of the first input channel and the second input channel that is biased, if the arbitration node is operating in the biased-input mode. The circuit is also configured to monitor the input traffic and initiate a mode change for the arbitration node based on a history of the observed input traffic in accordance with a mode-change policy. The circuit is further configured to implement the mode change by reconfiguring the arbitration node from the default-arbitration mode to the biased-input mode for operating in the biased-input mode, if the mode change is from the default-arbitration mode to the biased-input mode, or by determining a safe time window and reconfiguring the arbitration node within the safe time window from the biased-input mode to the default-arbitration mode for operating in the default-arbitration mode, if the mode change is from the biased-input mode to the default-arbitration mode and no data is about to arrive at the biased input channel. If the mode change is from the biased-input mode to the default-arbitration mode and data, on the other hand, is about to arrive at the biased input channel, the circuit may be further configured to implement the mode change by receiving the data at the biased input channel and processing the data before determining a safe time window and reconfiguring the arbitration node within the safe time window from the biased-input mode to the default-arbitration mode for operating in the default-arbitration mode.

The dynamically reconfigurable asynchronous arbitration node may further include a network-monitoring module in communication with the circuit, wherein the network-monitoring module includes a plurality of input ports, including a first input port and a second input port, and at least one output port, and is configured to support determining the safe time window by monitoring the input ports for an advance notification signal indicating whether an arrival of data at the biased input channel is imminent and alerting the circuit of the pending arrival. The advance notification signal includes an incoming-data (IND) signal and a no-incoming-data (NIND) signal. The advance notification signal for the first input channel is received at the first input port and the advance notification signal for the second input channel is received at the second input port.

In another embodiment, a method is provided for a dynamically reconfigurable asynchronous arbitration node supporting a plurality of operating modes including a default-arbitration mode and a biased-input mode in an adaptive asynchronous interconnection network. The method includes generating data for at least one output channel of the arbitration node by mediating amongst input traffic including data received at a plurality of input channels of the arbitration node, including data received at a first input channel and data received at a second input channel, if the arbitration node is operating in the default-arbitration mode, or by providing a direct path to the at least one output channel for one of the first input channel and the second input channel that is biased, if the arbitration node is operating in the biased-input mode. The method also includes monitoring the input traffic and initiating a mode change for the arbitration node based on a history of the observed input traffic in accordance with a mode-change policy. The method further includes implementing the mode change by reconfiguring the arbitration node from the default-arbitration mode to the biased-input mode for operating in the biased-input mode, if the mode change is from the default-arbitration mode to the biased-input mode, or by determining a safe time window and reconfiguring the arbitration node within the safe time window from the biased-input mode to the default-arbitration mode for operating in the default-arbitration mode, if the mode change is from the biased-input mode to the default-arbitration mode and no data is about to arrive at the biased input channel. If the mode change is from the biased-input mode to the default-arbitration mode and data, on the other hand, is about to arrive at the biased input channel, the method includes implementing the mode change by receiving the data at the biased input channel and processing the data before determining a safe time window and reconfiguring the arbitration node within the safe time window from the biased-input mode to the default-arbitration mode for operating in the default-arbitration mode.

In yet another embodiment, a configurable network-monitoring module is provided for use in an adaptive asynchronous interconnection network of a variant mesh-of-trees (MOT) topology. The configurable network-monitoring module includes a control circuit, input ports and output ports. If the network-monitoring module is coupled to and configured for an asynchronous root routing node, the control circuit is configured to send an advance notification signal through a signal path connecting one of the one or more output ports of the network-monitoring module with an input port of a next network-monitoring module coupled to an asynchronous non-root routing node that is located downstream of the interconnection network from the root routing node, when data enters the interconnection network from a source to an input channel of the root routing node. The advance notification signal can reach a plurality of nodes located downstream including the non-root routing node before the data does and alert the plurality of nodes of a pending arrival of the data.

If the network-monitoring module is coupled to and configured for an asynchronous non-root routing node, the control circuit is configured to receive at one of the one or more input ports an advance notification signal from another network-monitoring module coupled to one of an asynchronous root routing node or another asynchronous non-root routing node that is located upstream of the interconnection network from the non-root routing node. The advance notification signal indicates a pending arrival of data at an input channel of the non-root routing node. The control circuit is also configured to alert the non-root routing node of the pending arrival of the data and forward the advance notification signal through a signal path connecting one of the one or more output ports of the network-monitoring module with an input port of a next network-monitoring module coupled to one of another asynchronous non-root routing node or an asynchronous non-root leaf routing node that is downstream of the interconnection network from the non-root routing node. The advance notification signal can reach one or more nodes located downstream including the one of the another asynchronous non-root routing node or the asynchronous non-root leaf routing node before the data does and alert the one or more downstream nodes of the pending arrival of the data.

If the network-monitoring module is coupled to and configured for an asynchronous non-root arbitration node, the control circuit is configured to receive at one of the one or more input ports an advance notification signal from another network-monitoring module coupled to one of an asynchronous non-root leaf arbitration node or another asynchronous non-root arbitration node that is upstream of the interconnection network from the non-root arbitration node. The advance notification signal indicates a pending arrival of data at an input channel of the non-root arbitration node. The control circuit is also configured to alert the non-root arbitration node of the pending arrival of the data and forward the advance notification signal through a signal path connecting one of the one or more output ports of the network monitoring module with an input port of a next network-monitoring module coupled to one of another asynchronous non-root arbitration node or an asynchronous root arbitration node that is downstream of the interconnection network from the non-root arbitration node. The advance notification signal can reach one or more nodes located downstream including the one of the another asynchronous non-root arbitration node or the asynchronous root arbitration node before the data does and alert the one or more downstream nodes of the pending arrival of the data.

If the network-monitoring module is coupled to and configured for an asynchronous root arbitration node, the control circuit is configured to receive at one of the one or more input ports an advance notification signal from another network-monitoring module coupled to an asynchronous non-root arbitration node that is upstream of the interconnection network from the root arbitration node. The advance notification signal indicates an impending arrival of data at an input channel of the root arbitration node and alerts the root arbitration node of the impending arrival of the data.

BRIEF DESCRIPTION OF THE DRAWINGS

The disclosed subject matter is illustrated in the figures of the accompanying drawings which are meant to be exemplary and not limiting, in which like references are intended to refer to like or corresponding parts, and in which.

DETAILED DESCRIPTION

In the following description, reference is made to the accompanying drawings that form a part hereof, and in which is shown by way of illustration an embodiment in which the disclosed subject matter may be practiced. It is to be understood that other embodiments may be utilized and structural changes may be made without departing from the scope of the present disclosed subject matter.

The embodiments disclosed herein provide bi-modal arbitration nodes for asynchronous interconnection network for dynamic adaptivity. The bi-modal arbitration nodes can, among other things, reduce system latency without incurring high overhead by observing their recent local traffic and rapidly entering and leaving a special biased mode that allows an uncontended cut-through path based on the observed local traffic. Effectively, arbitration is bypassed for transient or persistent periods where only one input channel becomes active.

Figure 1:
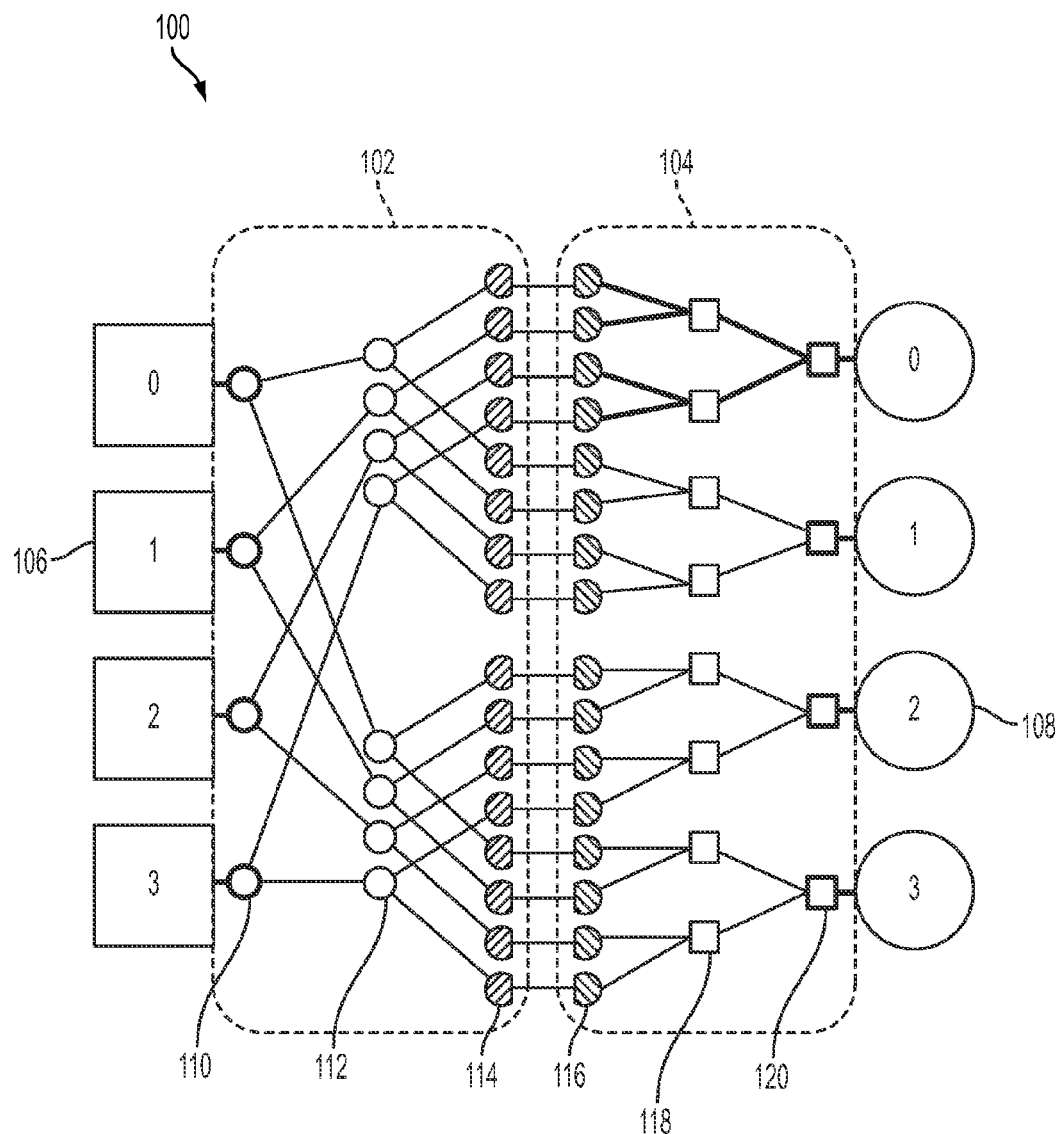
FIG. 1 is a diagram illustrating a variant mesh-of-trees (MoT) network in accordance with some embodiments of the disclosed subject matter.

FIG. 1 is a diagram illustrating a variant mesh-of-trees (MoT) network 100 in accordance with some embodiments of the disclosed subject matter. MoT Network 100 includes a set of binary fan-out trees 102, a set of binary fan-in trees 104, a set of sources 106 and a set of destinations 108. Each source 106 is connected to a root of a binary fan-out tree 102 and each destination 108 is connected to a root of a binary fan-out tree 104. A binary fan-out tree 102 includes a fan-out root node 110, a set of fan-out non-root nodes 112 and a set of fan-out non-root leaf nodes 114. A binary fan-in tree 104 includes a fan-in root node 120, a set of fan-in non-root nodes 118 and a set of fan-in non-root leaf nodes 116. A MoT network that connects N sources to M destinations has ($\log_2$ M+1) levels of fan-out trees and ($\log_2$ N+1) levels of fan-in trees. Network routing for MoT network 100 is deterministic and packets are source routed.

During operation, a flow-control-unit (flit), which is the smallest granularity of a message or packet that can be sent through a MoT network, enters MoT network 100 from a source 106 through a fan-out root node 110 and travels from fan-out root node 110 to one of fan-out non-root leaf node 114 of a corresponding fan-out tree 102 through one or more fan-out non-root nodes 112 (depending on the number of sources in the MoT network). The flit then passes to a fan-in non-root leaf node 116 of a corresponding fan-in tree 104 and further travels to a fan-in root node 120 of the fan-in tree 104 through one or more fan-in non-root nodes 118 (depending on the number of destinations in the MoT network) to reach its destination 108.

To minimize contention, fan-out trees 102 eliminate competition between packets from different sources 106 and fan-in trees 104 eliminate competition between packets to reach a common destination 108. This separation can ensure that, absent extremely unbalanced data traffic, packets between different sources 106 and destinations 108 would not interfere. MoT network 100 thus may provide high average throughput that may be close to its peak throughput.

MoT network 100 may be formed using two types of asynchronous switching primitives. One is asynchronous routing primitives and the other is asynchronous arbitration primitives. In one embodiment, these primitives may be based on a linear asynchronous pipeline that uses single-rail bundled data encoding, wherein a synchronous-style data channel is augmented with an extra wire referred to as Req wire, a single transition of which indicates that the accompanying bundled data is valid. In some embodiments, a two-phase (a.k.a., transition-signaling) protocol is used.

In one embodiment, MoT network 100 is used to provide increased bandwidth for a high-performance parallel processor with globally uniform memory access. For example, MoT network 100 may be chosen to serve as a high-speed parallel interconnect between the cores of chip microprocessors (CMPs) and partitioned shared level 1 (L1) data cache.

Figure 2:
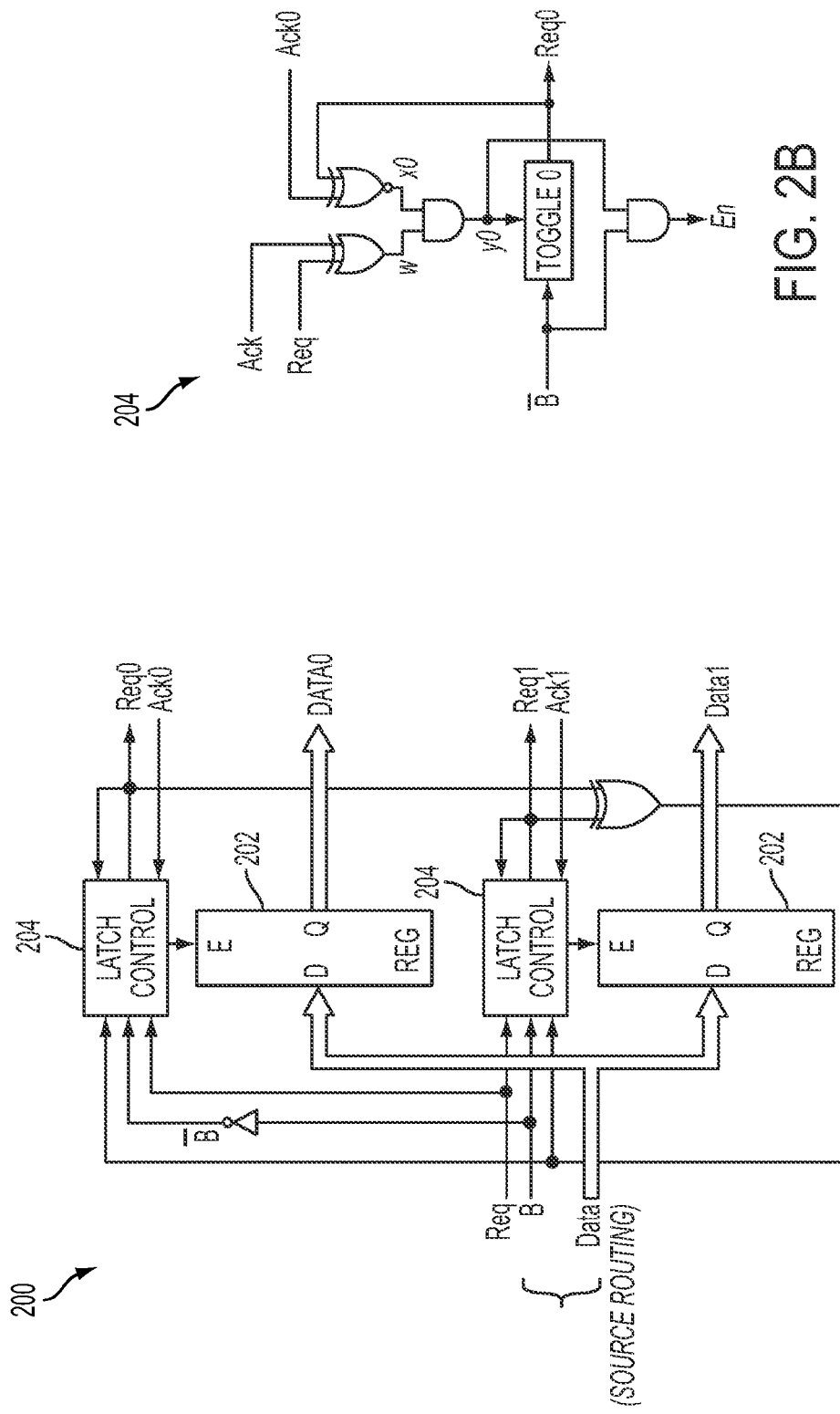
FIGS. 2A-2B are diagrams illustrating a basic asynchronous routing primitive and a latch control of the routing primitive in accordance with some embodiments of the disclosed subject matter.

FIGS. 2A-2B are diagrams illustrating an asynchronous routing primitive 200 and a latch control 204 of routing primitive 200 in accordance with some embodiments of the disclosed subject matter. Routing primitive 200 receives one incoming stream of data and conditionally passes it to one of two outgoing streams. When the stage of the routing primitive is empty, data registers 202 are opaque. Following a bundled-data encoding, the routing operation begins with new data arriving, including routing signal B. After the input data becomes stable and valid, a request transition on Req is received at the input. Then, the latch controller 204 of the input channel selected by the routing signal B enables the latches in data register 202 of the selected input channel, making the latches transparent, thereby allowing the input data to flow to the next stage.

In order to complete the asynchronous handshaking, three operations are preformed in parallel. First, a request transition, Req0 or Req1, is sent to the next stage that is selected by the routing signal B. Second, the data latches are made opaque again to protect the recently-received data. Third, an acknowledgement transition, Ack, is sent to the previous stage. This completes one full cycle of operation for routing primitive 200. Because it has a separate set of latch control modules 204 and data registers 202 for each output channel, this node of routing primitive 200 is able to decouple processing between the two output routing channels. For example, even if one of the output channels is stalled awaiting acknowledgment, the other output channel can successively process one or more full transactions. This concurrency feature can provide the capability of a limited virtual input channel, thereby providing significant system-level performance benefits.

The arbitration primitive mediates between two incoming streams of flits by enforcing mutual exclusion and merges the result into a single outgoing stream, thereby providing complementary functionality to the routing primitive.

Figure 3:
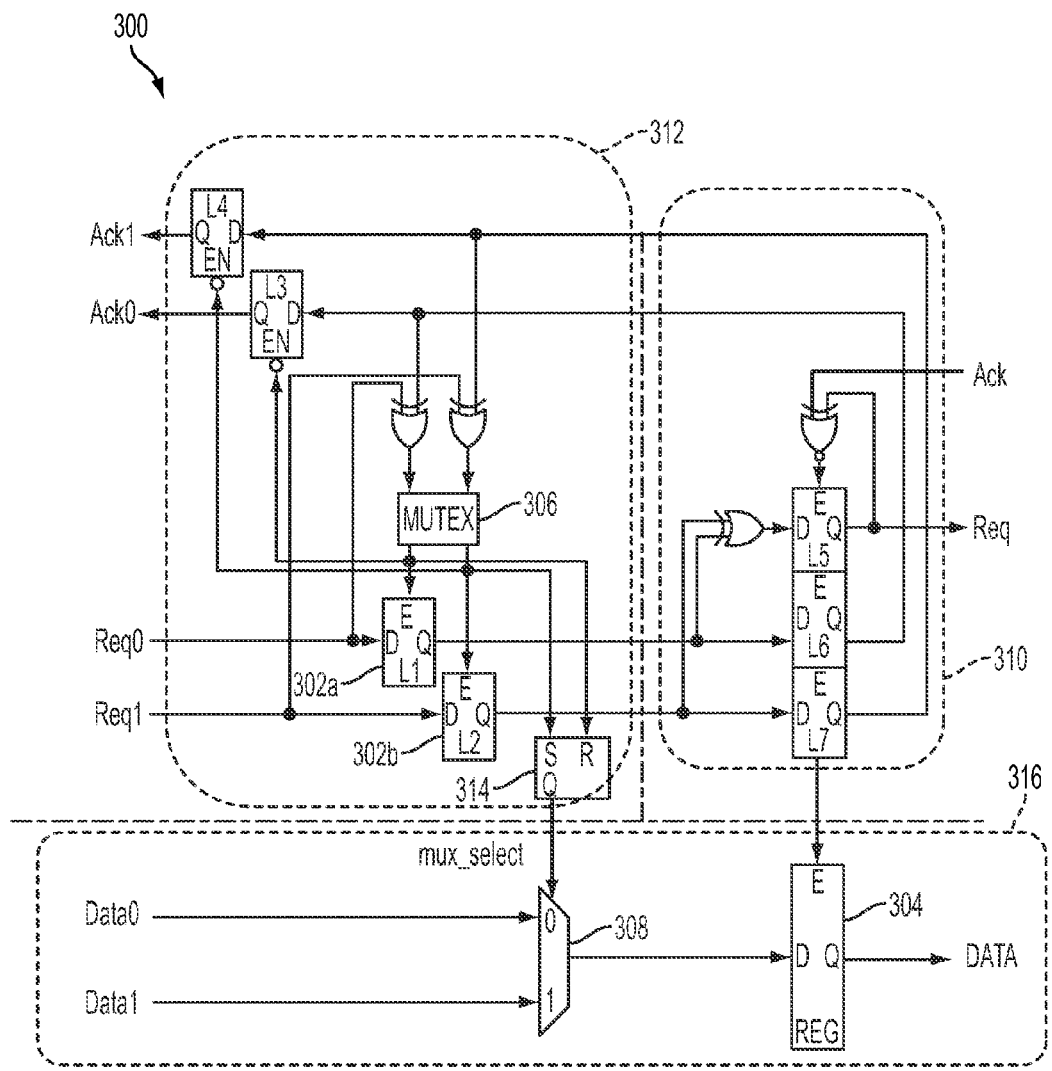
FIG. 3 is a diagram illustrating a basic asynchronous arbitration primitive in accordance with some embodiments of the disclosed subject matter.

FIG. 3 is a diagram illustrating a basic asynchronous arbitration primitive 300 in accordance with some embodiments of the disclosed subject matter. When basic arbitration primitive 300 is empty, control latches 302a and 302b are opaque while all other latches (e.g., latches in data register 304, etc.) except SR latch 314 are transparent. Following a bundled data encoding, the arbitration operation begins when data appears at the input of arbitration primitive 300 followed by a request transition (Req0 or Req1) from one of two previous stages (e.g., another arbitration primitive or a routing primitive). In order to resolve contention between potentially concurrent incoming requests, the incoming request must first trigger a lock on mutex 306.

Next, two operations take place concurrently. First, correct input data is chosen by multiplexer 308 using a multiplexer select signal, mux_select, received from mutex 306. Second, corresponding control latch (302a or 302b) is enabled, thereby forwarding the winning request (Req0 or Req1) and generating a transition on the output of Latch L5 and one of Latches L6 and L7. Latch controller 310 then protects the data (Data0 or Data1) by making data register 304 and Latches L5-L7 opaque (thereby safely storing the data), generating a request (Req) to the next stage, and acknowledging to flow control module 312 that the data has been safely stored. The input data received at the selected input channel is then forwarded to the output channel. In order to complete a full cycle, flow control module 312 will reset mutex 306 and send an acknowledgement (Ack0 or Ack1) to the previous stage. In one embodiment, SR latch 314 is used to maintain the value of mux_select as a power optimization, thereby preventing unnecessary switching on datapath 316.

Figure 4:
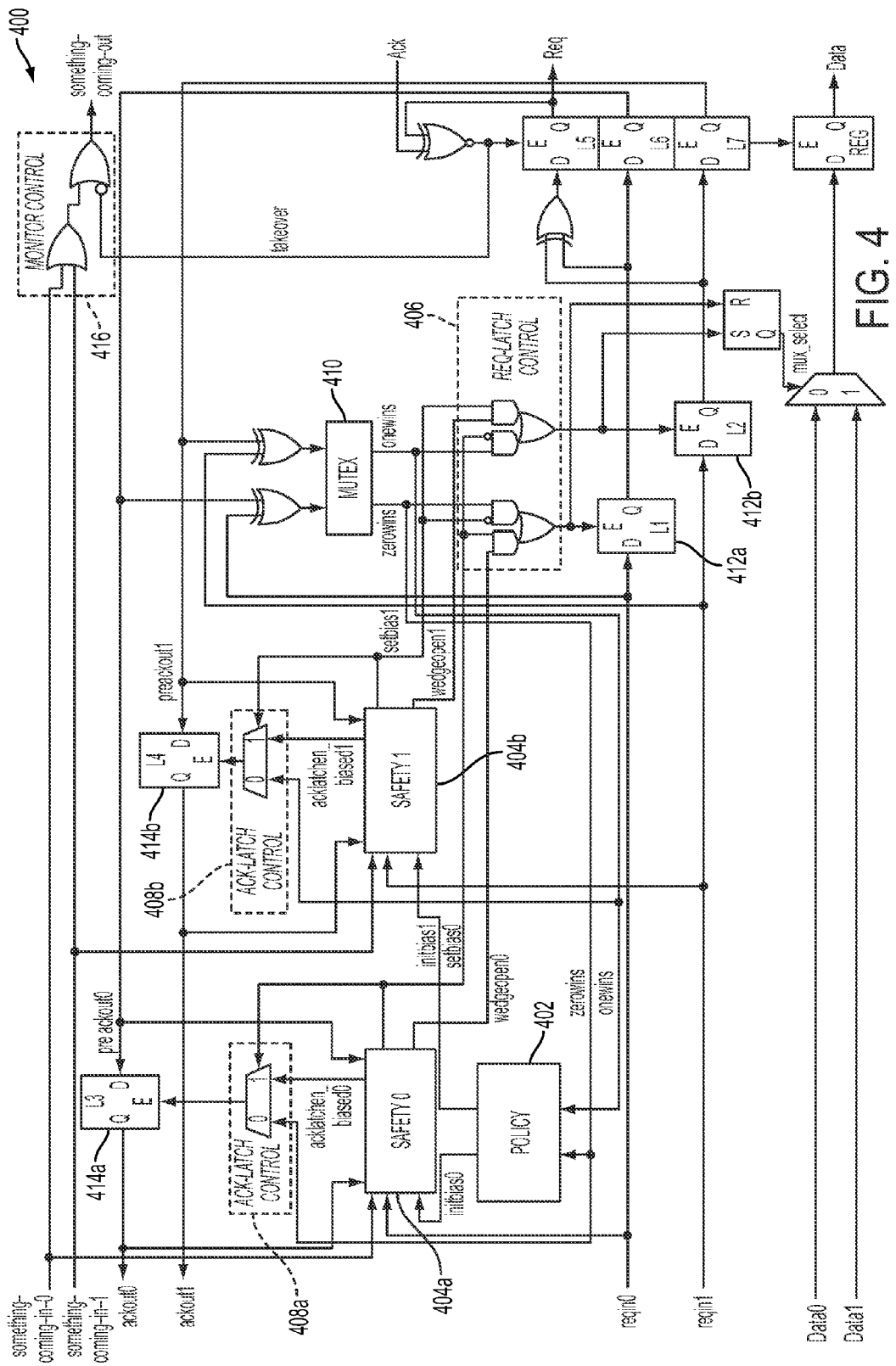
FIG. 4 is a diagram illustrating a dynamically reconfigurable bi-modal asynchronous arbitration primitive in accordance with some embodiments of the disclosed subject matter.

FIG. 4 is a diagram illustrating a dynamically reconfigurable bi-modal asynchronous arbitration primitive 400 in accordance with some embodiments of the disclosed subject matter. Dynamically reconfigurable bi-modal arbitration node 400 builds on the non-configurable arbitration node, such as basic asynchronous arbitration primitive 300, by adding dynamic-mode-change capability. Bi-modal arbitration node 400 can be either in a default-arbitration mode or a biased-input mode, which includes a biased-to-0 mode and a biased-to-1 mode.

Bi-modal arbitration node 400 enters, e.g., the biased-to-0 mode when recent traffic has been observed only on the input channel 0, also referred to as "upper input channel," while the input channel 1, also referred to as "lower input channel," is inactive. In the biased-to-0 mode, bi-modal arbitration node 400 effectively operates as a fast-forward single input channel node, thereby entirely bypassing the arbitration process.

Bi-modal arbitration node 400 exits the biased-input mode, thereby reverting to the default-arbitration mode, when any flit arrives on the inactive input channel (e.g., input channel 1 when in biased-to-0 mode). It is noted that once bi-modal arbitration node 400 is in one biased-input mode, it always passes through the default-arbitration mode before changing to the other biased-input mode, and hence all state changes are between the default-arbitration mode and one of the two biased-input modes (biased-to-0 mode and biased-to-1 mode).

The mode change of a bi-modal arbitration node, such as bi-modal arbitration node 400, is determined based solely on its recently observed traffic history, and is therefore independent from the state of the adjacent nodes. In one embodiment, a mode change policy may require bi-modal arbitration node 400 to change its operation mode (1) from the default-arbitration mode to the biased-input mode (e.g., biased-to-1 mode), if two successive flits from one input channel (e.g., input channel 1) are processed by the node, and (2) from the biased-input mode (e.g., biased-to-1 mode) to the default-arbitration mode, if a flit arrives on the opposite, inactive input channel (e.g., input channel 0).

In one embodiment, a safe time window is selected when the operation mode is changing from the biased-input mode to the default-arbitration mode. This is because there is no reference clock for asynchronous operations and thus new flits may arrive at arbitrary times, and care must be taken that reconfiguration of bi-modal arbitration node 400 is applied in a suitable interval. In one embodiment, a lightweight asynchronous monitoring network is added for determination of a safe time window.

Bi-modal arbitration node 400 includes a policy module 402, a safety module 404 for each input channel (404a for input channel 0 and 404b for input channel 1), a reconfigurable Req-Latch control module 406, a mutex 410, input request latches 412a and 412b, a reconfigurable Ack-Latch control module 408 for each input channel (408a for input channel 0 and 408b for input channel 1), Acknowledge Latches (Ack Latches) 414a and 414b, and a monitor control unit 416. Policy module 402 indicates the current mode of bi-modal arbitration node 400 and initiates all mode changes. Policy module 402 is in effect a local monitor for observing the recent history of flits that have arrived on the input channels that have won arbitration. The inputs to policy module 402 include the outputs, zerowins and onewins, from mutex 410. The outputs from policy module 402 include two state bits, initbias0 and initbias1, which encode the current mode—e.g., "00" indicates the default-arbitration mode, "10" indicates biased-to-0 mode, and "01" indicates biased-to-1 mode.

Figure 5:
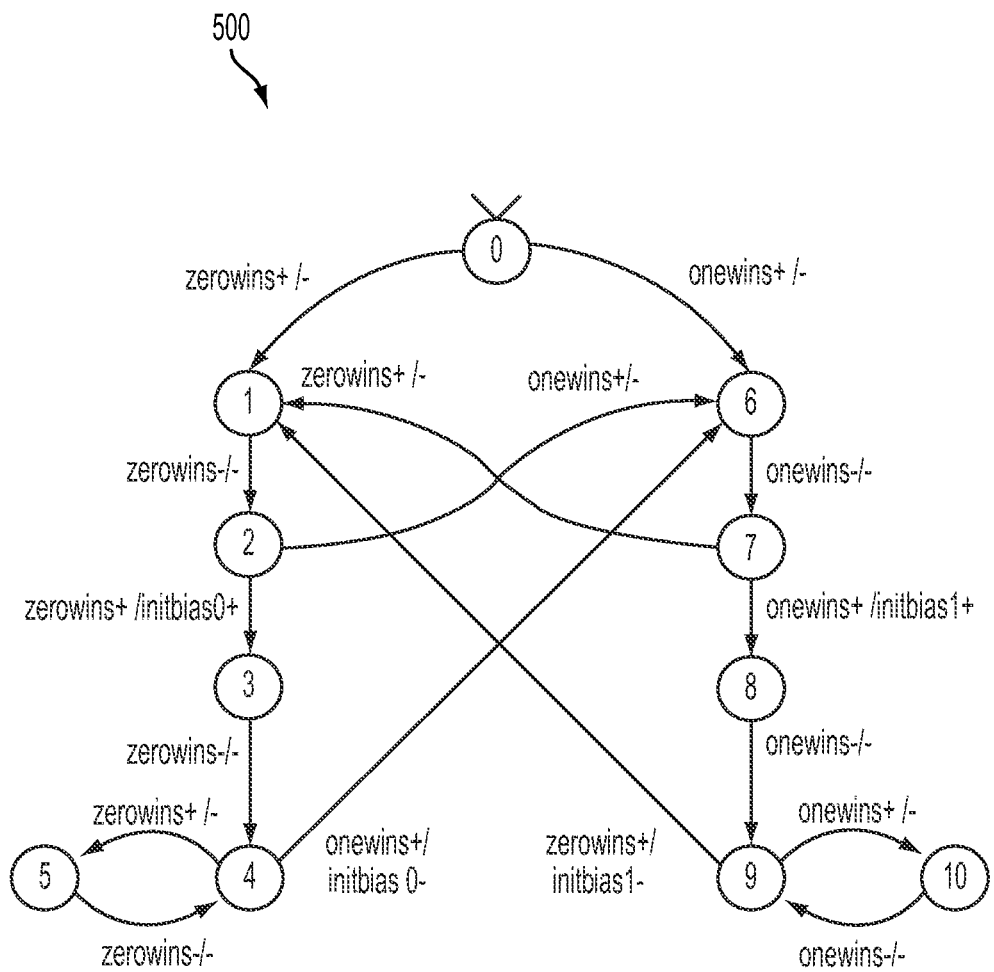
FIG. 5 is a diagram illustrating an operation specification of a Mealy-type asynchronous state machine that can be used to implement a policy module for a dynamically reconfigurable bi-modal asynchronous arbitration primitive in accordance with some embodiments of the disclosed subject matter.

Policy module 402 initiates all mode changes according to a mode change policy. In one embodiment, the mode change policy implemented in policy module 402 is reconfigurable. In some embodiments, policy module 402 is implemented as a burst-mode asynchronous controller, which is a Mealy-type asynchronous state machine 500 that can be operated as shown in FIG. 5.

Safety modules 404a and 404b implement the mode changes initiated by policy module 402. The outputs of safety module 404, setbias0 or setbias1 and wedgeopen0 or wedgeopen1, reconfigure Req-Latch control module 406 and Ack-Latch control module 408a or 408b for the corresponding mode changes. For a mode change from the default-arbitration mode to the biased-input mode (e.g., biased-to-0 mode), for example, safety module 404 immediately asserts, e.g., setbias0, high to start a reconfiguration process for bi-modal arbitration node 400.

Req-Latch control module 406 may be used to enable two input request latches 412a and 412b. In the default-arbitration mode, Req-Latch control module 406 operates to keep input request latches 412a and 412b opaque until mutex 410 is won. In the biased-input mode, however, Req-Latch control module 406 enables fast-forwarding of flits through bi-modal arbitration node 400 on the biased input channel by, e.g., wedging open, or holding transparent, the corresponding latch (e.g., input request latch 412a in the biased-to-0 mode) and wedging shut, or holding opaque, the other latch (e.g., input request latch 412b). Ack-Latch control module 408 may be also likewise reconfigured in the biased-input mode—i.e., Ack-Latch control modules 408a and 408b are initially opaque and held open/transparent in demand when a new flit arrives.

In the default-arbitration mode, bi-modal arbitration node 400 conducts the steady-state operation as following: policy module 402 is in the default state, "00" (i.e., initbias0=0, initbias1=0) and safety module 404 outputs, setbias0 and setbias1, are both set to zero. Hence, input request latches 412a and 412b are opaque and exactly one of the input channels passes data when a corresponding input flit has won arbitration—i.e., when zerowins or onewins, respectively, is asserted high. Likewise, Ack Latches 414a and 414b are transparent and one of the latches (i.e., latch for the channel of the selected flit) becomes opaque as soon as a corresponding input flit has won arbitration. The blocked (opaque) latch becomes transparent again when mutex 410 is reset.

For example, a flit arriving on input channel 0, if uncontended, results in a forward path of reqin0 toggled on the input channel, passing through an $XOR_2$ gate through mutex 410, through Req-Latch control module 406 to enable input request latch 412a, through another $XOR_2$ gate, through Latch L5 to a toggle on Req on the output channel and through Latch L6 to toggle on ackout0.

In the biased-input mode, bi-modal arbitration node 400 conducts the steady-state operation as following: assuming the biased-to-0 mode is active, policy module 402 is in the biased-to-0 state, "10" (i.e., initbias0=1, initbias1=0) and only safety module 404a has asserted its reconfiguration output (i.e., setbias0=1, setbias1=0). The wedgeopen0 signal is also asserted high. Hence, input request latch 412a is held transparent and input request latch 412b is held opaque. Any arriving flit on input channel 0 can pass directly through input request latch 412a, while any flit on input channel 1 is blocked by input request latch 412b. Ack Latch 414a is now by default opaque and becomes transparent as soon as a new flit arrives on input channel 0, while Ack Latch 414b is now transparent but with no activity. Ack Latch 414a becomes opaque again after ackout0 makes a transition.

In some embodiments, mutex 410 is initially in the all zero state (i.e., all inputs/outputs are clear) in the biased-input mode. When a new flit arrives on input channel 0 (indicated by a toggle on reqin0), mutex 410 is still acquired (as in the default-arbitration mode) through a transition in input channel 0, resulting in a transition in zerowins output. This acquisition of mutex 410, however, is done in parallel with other activities (e.g., background activities) and has no effect on the fast forward biased path 0—i.e., the mutex acquisition is done in background without interfering with other activities. When a transition occurs at Latch L5 and, e.g., Latch L6, the transition at L6 latch causes the reset of mutex 410. The mutex reset is also done in parallel with other activities in background.

For example, a flit arriving on input channel 0 results in a much shorter forward path of reqin0 toggled on the input channel, passing through input request latch 412a (transparent), through an $XOR_2$ gate, through latch L5 to a toggle on Req on the output channel and through latch L6 to a toggle on ackout0. The critical forward latency of bi-modal arbitration node 400 consists only of two latch delays and one $XOR_2$ delay. The cycle time to generate ackout0 signal is also shortened for bi-modal arbitration node 400, since the setting and resetting of mutex 410 has been eliminated from the path.

Figure 6A:
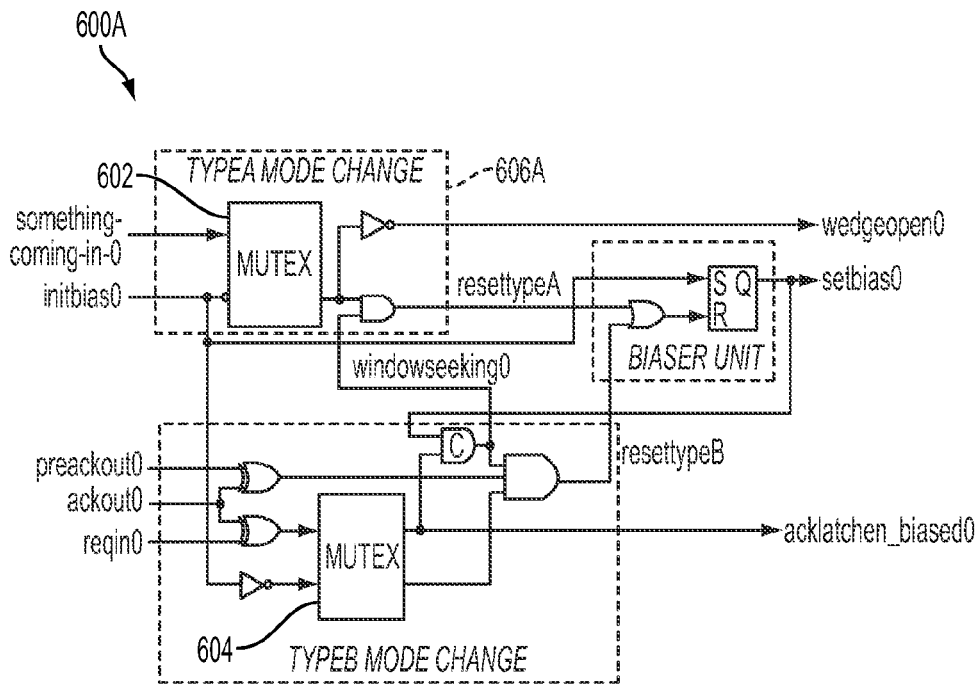
FIG. 6A is a diagram illustrating a basic safety module for a dynamically reconfigurable bi-modal asynchronous arbitration primitive in accordance with some embodiments of the disclosed subject matter.

FIG. 6A is a diagram illustrating a basic safety module 600A for bi-modal arbitration node 400 in accordance with some embodiments of the disclosed subject matter. FIGS. 4 and 6A will be referenced together to describe mode change operations of bi-modal arbitration node 400.

In the operation of bi-modal arbitration node 400 involving a mode change from the default-arbitration mode to the biased-input mode (e.g., biased-to-0 mode), policy module 402 first initiates the mode change (initbias0 initbias1 from "00" to "10") and the rising transition on initbias0 is received by safety module 0, 404a. Referring to FIG. 6A, the bottom input of both Type A mutex 602 and Type B mutex 604 is then released (after inversion) and the setbias0 output is asserted high, which then reconfigures Req-Latch control module 406 and Ack-Latch control module 408. Since Type B mutex 604 is released, it then allows the acklatchen_en-biased0 signal to be generated for the biased-input mode (biased-to-0 mode) from reqin0 and ackout0 events. This may be described as no-overhead mode change operation because the flit arriving on input channel 0 that triggers the mode change is not delayed—i.e., reconfiguration of bi-modal arbitration node 400 occurs concurrently while the flit is forwarded to the output channel.

In the operation of bi-modal arbitration node 400 involving a mode change from the biased-input mode (e.g., biased-to-0 mode) to the default-arbitration mode, policy module 402 again initiates the mode change by de-asserting initbias0 to low. Eventually, safety module 0, 404a will de-assert its setbias0 output low, thereby reconfiguring arbitration node 400 to the default node.

A safe time window must be obtained before reconfiguration can be applied—i.e., before setbias0 is de-asserted. In particular, no flit may arrive on input channel 0 after reconfiguration has started, since it may cause malfunction during the closing of input request latch 412a. A simple solution would be to wait until there is no traffic arriving on input channel 0, to change mode. If, however, there is continuous traffic on input channel 0, it could result in starvation on input channel 1. An alternative solution may be that (i) if no traffic is coming to the input channel 0, the mode change can be initiated immediately (Type A mode change) but (ii) if some traffic is coming to the input channel 0, the mode change is delayed until the next flit arrives on the input channel 0 and the initiation of the mode change may be piggy-backed once the processing of the arrived flit is completed (Type B mode change).

As shown in FIG. 6A, a new monitoring input signal referred as something-coming-in-0 is provided on the input channel, indicating whether a new flit is arriving soon. When the mode change request arrives from policy module 402—i.e., when the initbias0 is de-asserted to 0—the mode change request is arbitrated with the monitoring input signal. If the mode change request arrives when nothing is yet coming, a Type A scenario is initiated wherein the initbias0 signal (after inversion) wins mutex 410, input request latch 412a becomes opaque (i.e., the wedgeopen0 is set to 0), and the mode change is safely implemented (i.e., the resettypeA signal is set to 1, and then the setbias0 to 0).

If, however, the mode change request arrives when the something-coming-in-0 indicates that something is coming to the input channel 0, a Type B scenario is initiated wherein Type A mutex 602 is locked (by its top input something-coming-in-0) and Type B mutex 604 will be locked (by its bottom input initbias0 inverted). Once the flit passes through arbitration node 400—i.e., once the preackout0 toggles—the mode change is safely implemented (i.e., the resettypeB signal is set to 1, and then the setbias0 to 0).

In some embodiments, a lightweight monitoring network has been introduced to find a safe time window for performing mode changes. To find a safe time window, however, a system-level timing constraint must be met. Specifically, a monitoring signal, such as something-coming-in-0 or something-coming-in-1, that traverses a corresponding path in the monitoring network must arrive far enough in advance of the flit arrival such that the fan-in stage of bi-modal arbitration node 400 can safely complete the mode change. The path within a fan-in node of bi-modal arbitration node 400 to safely complete the mode change includes a component with a variable delay: a mutex lock. Because gaining a mutex lock may have unbounded delay depending on the relative arrival time of its two competing input requests (i.e., though gaining a mutex lock often takes a nearly fixed delay, the delay may increase exponentially if the two input requests arrive very close together in some occasions), correctly obtaining a safe time window operates with some mean-time-between-failure (MTBF).

Figure 6B:
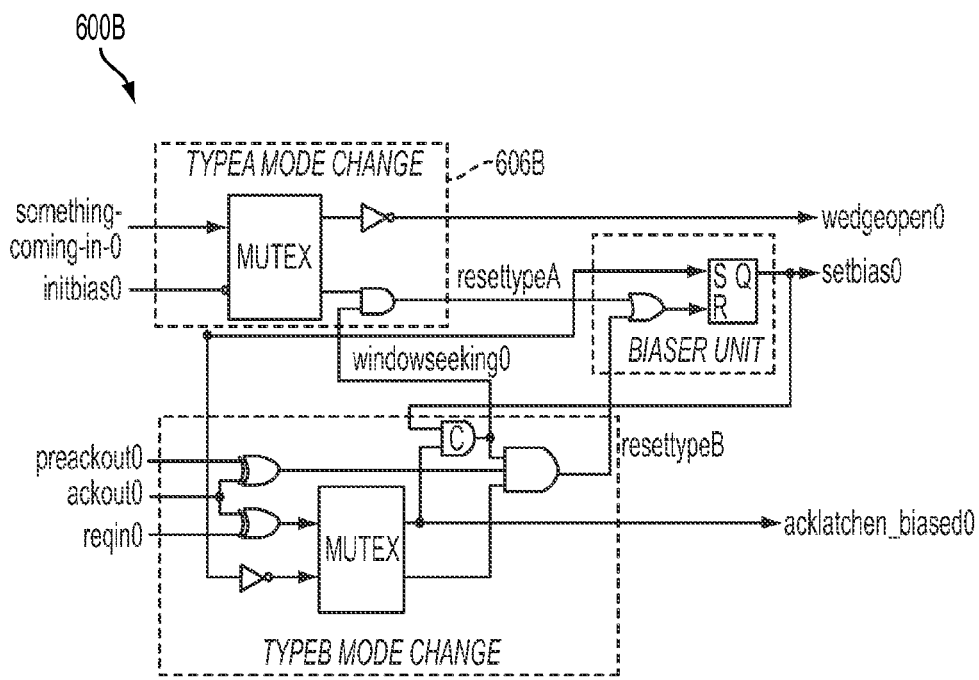
FIG. 6B is a diagram illustrating a safety module for a dynamically reconfigurable bi-modal asynchronous arbitration primitive that can eliminate timing constraints in accordance with some embodiments of the disclosed subject matter.

FIG. 6B is a diagram illustrating a safety module 600B that can eliminate timing constraints having a mean-time-between-failure (MTBF) in accordance with some embodiments of the disclosed subject matter. When operating with safety module 600A, the lightweight monitoring network was essentially irrelevant during the steady-state operation in the biased-input mode—i.e., changes in the monitoring network signal had no effect on the operation of arbitration node 400. When operating with safety module 600B including Type A mode change unit 606B (modified from Type A mode change unit 606A), however, the lightweight monitoring network has an effect on arbitration node 400 during the steady-state operation in the biased-input mode. For example, when there is no data coming on the biased input channel (Type A mode change scenario), arbitration node 400 completes a first of two parts of the operations that must be performed to complete the mode change to the default-arbitration mode, thereby putting the node into a safe state and protecting it from dangerous incoming flits. In some embodiments, the first part of the mode change operation includes one or more circuit operations.

In safety module 600A, for instance, input request latch 412a is default transparent in the biased-input mode, thereby creating a fast-forwarding path through arbitration node 400. In safety module 600B, however, input request latch 412a is default opaque in the biased-input mode and, essentially, the node completes one or more steps of a Type A node change operation any time it is signaled that nothing is coming to the biased input channel. Input request latch 412a becomes transparent only on demand when it is signaled that something is coming to the biased input channel.

Figure 7A:
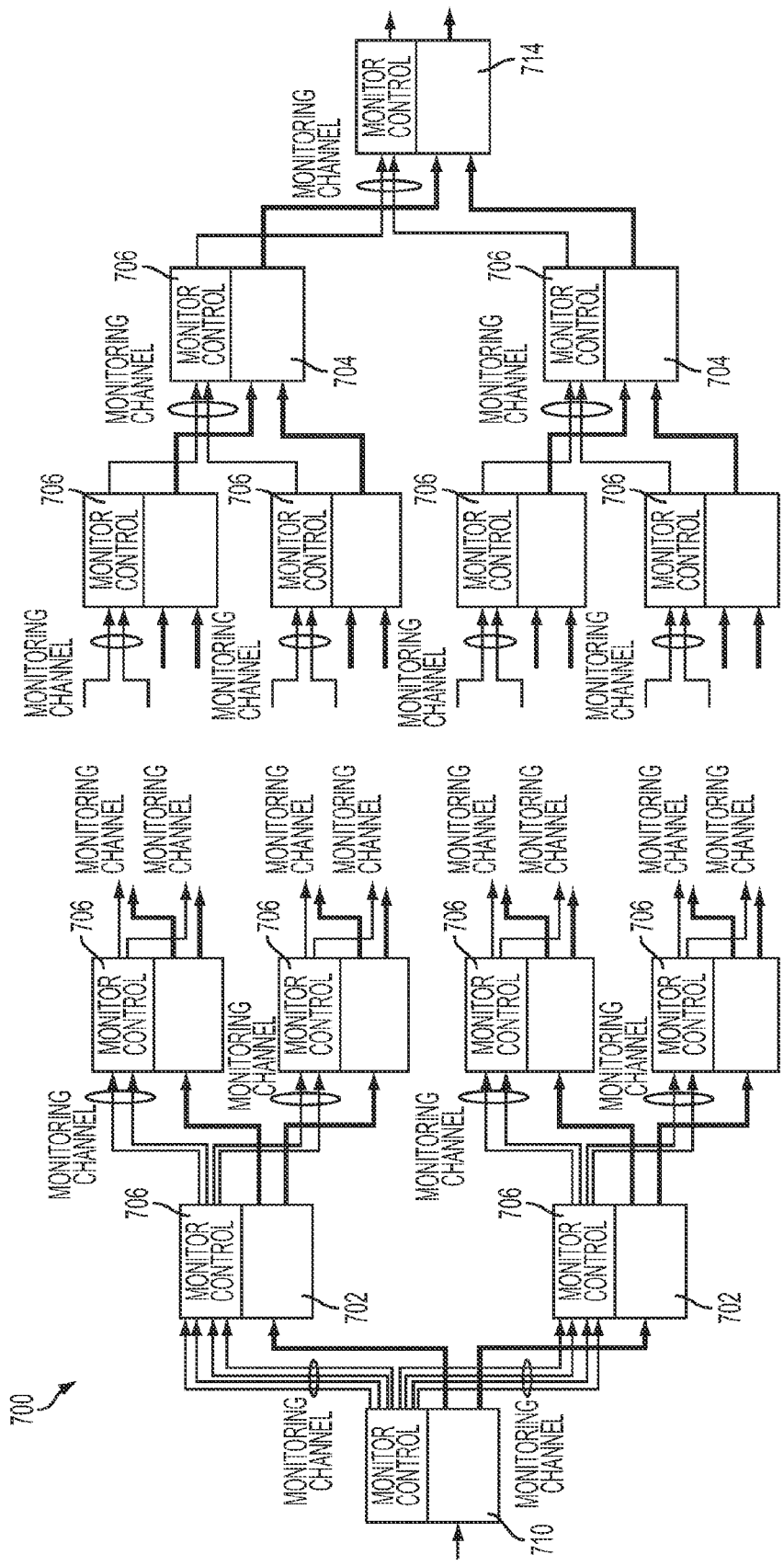
FIGS. 7A-7B are diagrams illustrating a lightweight monitoring network that can be used to determine a safe time window in accordance with some embodiments of the disclosed subject matter.
Figure 7B:
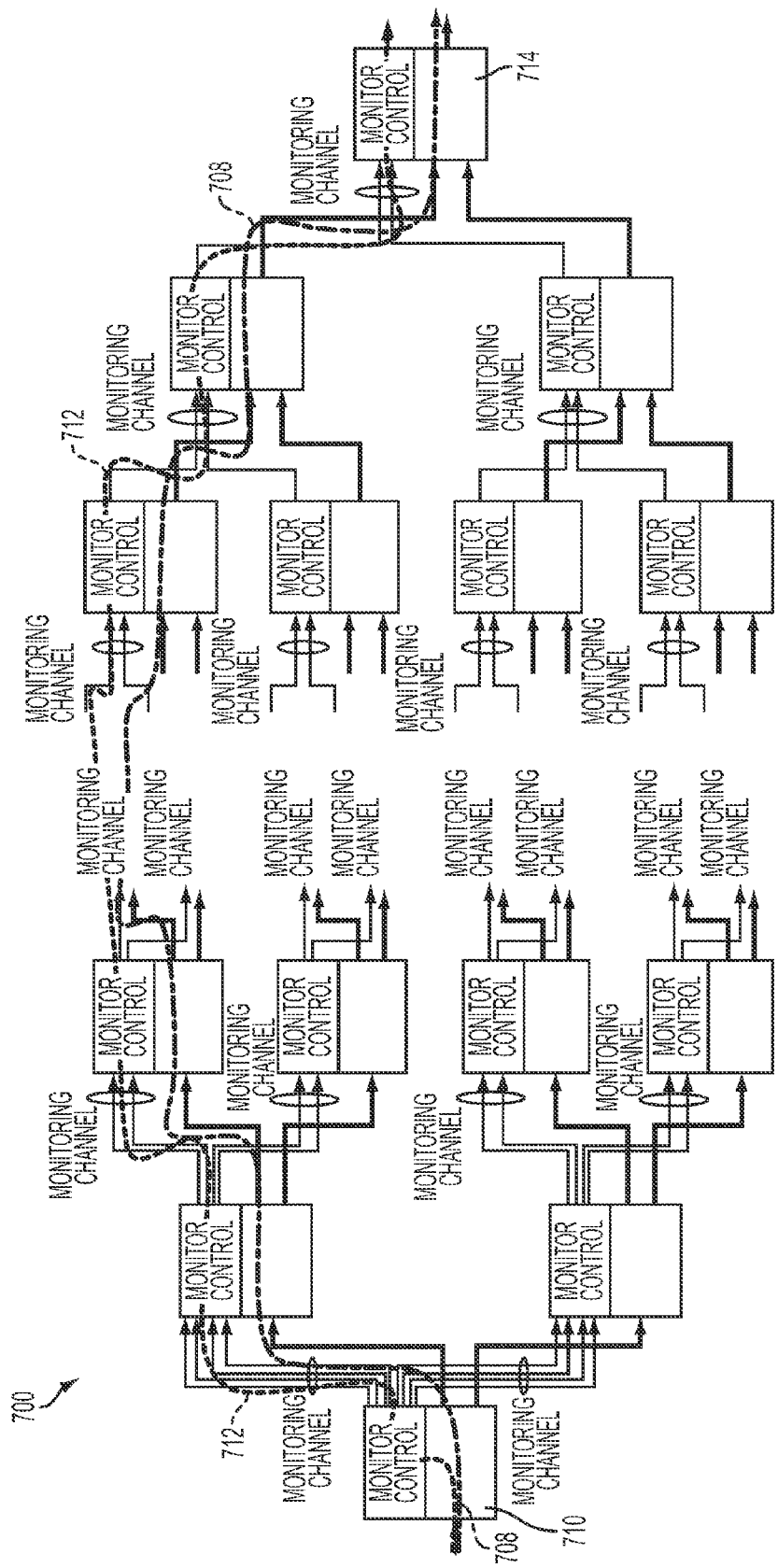

FIGS. 7A-7B are diagrams illustrating a lightweight monitoring network 700 that can be used to determine a safe time window in accordance with some embodiments of the disclosed subject matter. Lightweight monitoring network 700 includes a plurality of monitor control units 706 and provides continuous information to each arbitration node in an adaptive interconnection network, if any flit entering the interconnection network is heading towards it.

For modularity, as shown in FIG. 7A, monitoring network 700 is combined into an adaptive MoT interconnection network such that each node—either routing node 702 or arbitration node 704—in the adaptive network can take advantage of monitoring signals traversing monitoring network 700. In some embodiments, an independent monitor control unit, such as monitor control unit 706, having input and output ports for propagation of monitoring signals, is coupled to each routing and arbitration node in the adaptive MoT network. In other embodiments, each routing and/or arbitration node in the adaptive MoT network is modified to implement monitor control unit 706. In some embodiments, monitoring channels (e.g., the input and output ports of monitor control unit 706) of network 700 and the MoT network data channels (e.g., the input and output channels of routing nodes 702 and arbitration nodes 704) are combined, thereby removing the need for new inter-cell channels.

Whenever a flit 708 enters an adaptive MoT interconnection network from a source through a root routing node 710, as shown in FIG. 7B, lightweight monitoring network 700 initiates a monitoring signal transition. A monitoring signal 712 is rapidly forwarded through the fan-out network (i.e., routing nodes) with a path determined by the flit's source-routed address bits. Monitoring signal 712 is then forwarded through the fan-in network (i.e., arbitration nodes) to the target root 714 to reach a destination. Effectively, monitoring signal 712 is an advance notification of data flit 708, traversing the same path. For example, every bi-modal arbitration node, such as bi-modal asynchronous arbitration node 400, along the path uses monitoring signal 712 as either a something-coming-in-0 or a something-coming-in-1 signal, depending on the connections.

Figure 8:
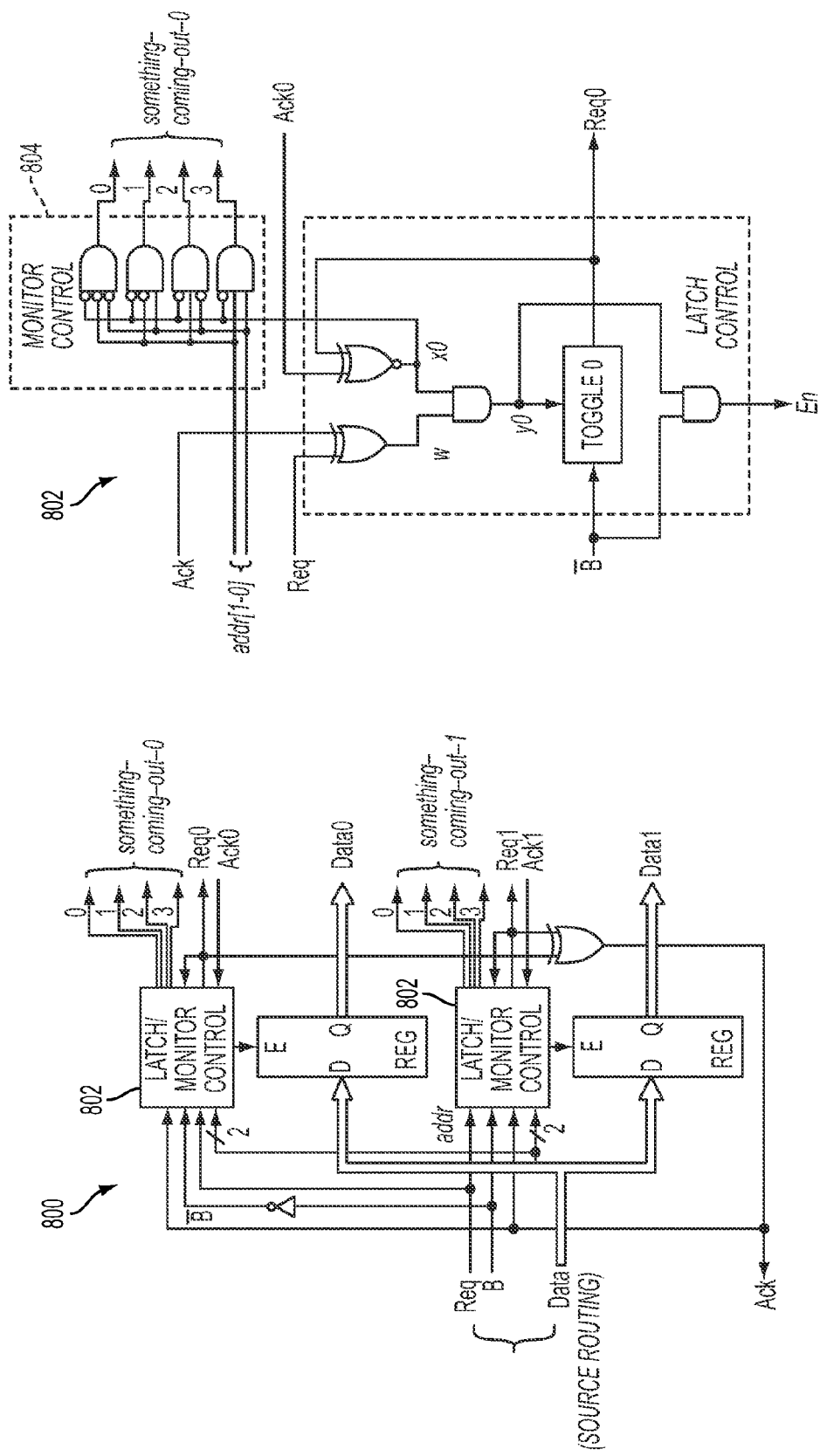
FIG. 8 is a diagram illustrating a root asynchronous routing node including a monitor control unit in accordance with some embodiments of the disclosed subject matter.

FIG. 8 is a diagram illustrating a root asynchronous routing node 800 including a monitor control unit 804 in accordance with some embodiments of the disclosed subject matter. Root routing node 800 includes a set of latch-monitor control units 802, one for each output channel. Latch-monitor control unit 802 in turn includes a monitor control unit 804. In root routing node 800, when a flit enters an interconnection network through it, monitor control unit 804 in latch-monitor control unit 802 generates a monitoring signal, such as monitoring signal 712, and routes the signal to 1 of n distinct monitoring signal ports on one of two output channels, depending on the flit's target address. In a 4×4 (four sources and four destinations) interconnection network, for example, monitoring control unit 804 routes the monitoring signal to 1 of 4 distinct monitoring signal ports on one of two output channels.

Figure 9:
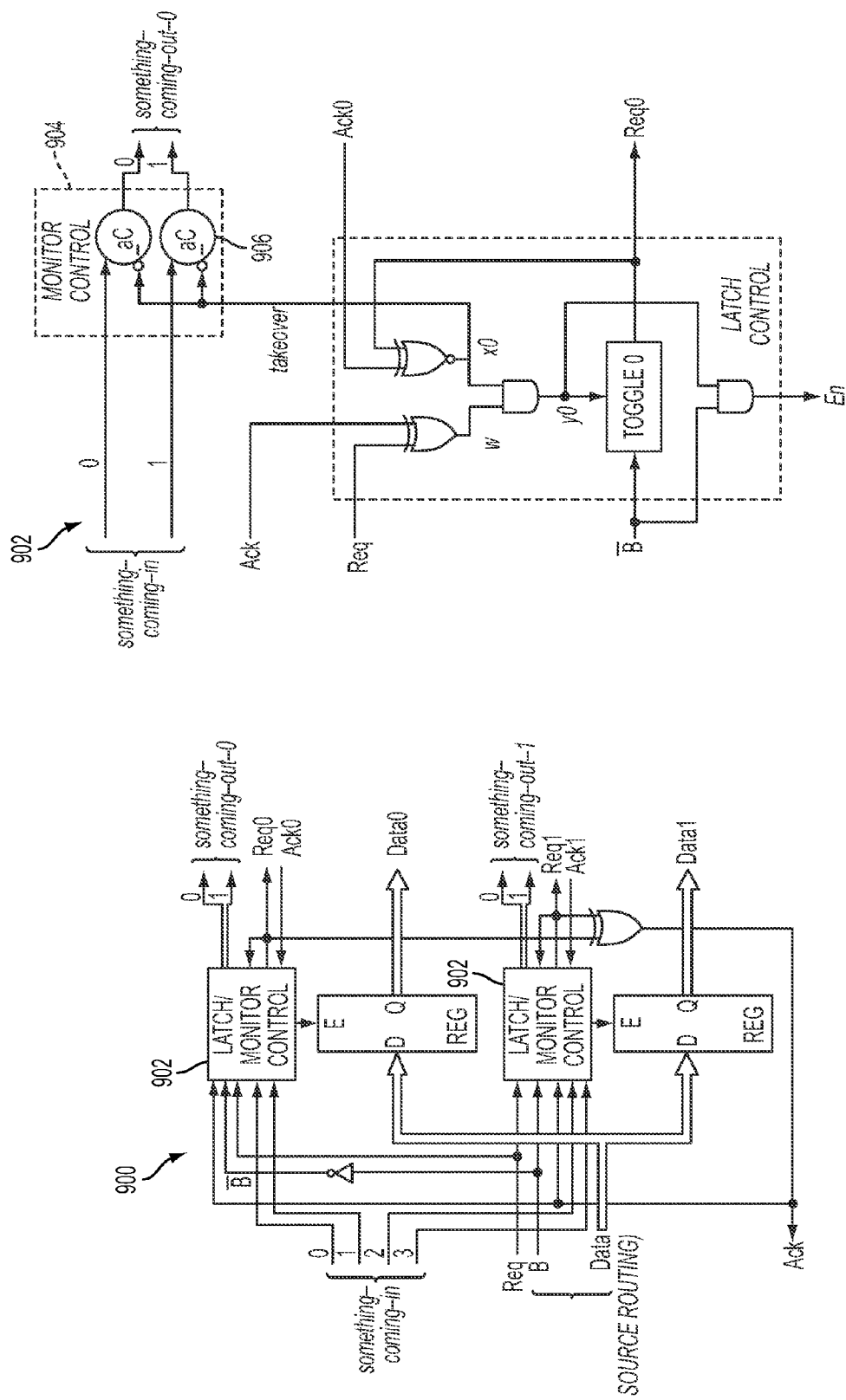
FIG. 9 is a diagram illustrating a non-root asynchronous routing node including a monitor control unit in accordance with some embodiments of the disclosed subject matter.

FIG. 9 is a diagram illustrating a non-root asynchronous routing node 900 including a monitor control unit 904 in accordance with some embodiments of the disclosed subject matter. Non-root routing node 900 includes a set of latch-monitor control units 902, one for each output channel. Latch-monitor control unit 902 in turn includes a monitor control unit 904. In non-root routing node 900, monitor control unit 904 in latch-monitor control unit 902 receives a monitoring signal, such as monitoring input signal 712, and demultiplexes it to a monitoring signal port on one of two output channels based on an address bit. In a 4×4 interconnection network, for example, monitor control unit 904 routes the monitoring signal to 1 of 2 output ports on one of two output channels.

A monitor control unit for a non-root-leaf asynchronous routing node is nearly identical to monitor control unit 904 of non-root asynchronous routing node 900. For example, whereas monitor control unit 904 has two something-coming-in inputs and two something-coming-out outputs, the monitor control unit for non-root-leaf routing node has one something-coming-in input and one something-coming-out output and, therefore, includes only one aC element, such as aC element 906, shown in FIG. 9.

The arbitration nodes, such as bi-modal arbitration node 400, then combine input monitoring signals onto one output monitoring signal, using a monitor control unit, such as monitor control unit 416, shown in FIG. 4. In some embodiments, an asynchronous monitoring network, such as lightweight monitoring network 700, is entirely implemented using standard cells.

The performance of a bi-modal asynchronous arbitration node, such as bi-modal arbitration node 400, has been evaluated in terms of area, latency, and maximum throughput. As a baseline for comparison, the basic asynchronous arbitration nodes, such as basic asynchronous arbitration node 300, were re-implemented and re-evaluated. Both the bi-modal arbitration nodes and the basic arbitration nodes were implemented using ARM 90 nm SAGE-X standard cells with a 32-bit wide datapath. Simulation results were obtained at normal temperature and voltage (25° C., 1.0 Volt) using Hspice in a Cadence Virtuoso environment.

Implementing bi-modal and network monitoring capability add some area overhead to the dynamically reconfigurable bi-modal asynchronous primitives. In order to obtain area results, the final layout area was estimated by summing the cell areas of the pre-layout cells and then dividing by a typical packing factor of 0.8. Table 1 shows the total node area, which includes both control and data path, and the control area alone. For the routing primitive, the control overhead is less than 9% for both the typical (non-root) and root nodes. For the arbitration primitive the control area is twice higher than the baseline area. Because the 32-bit datapath area dominates the control area, the percent area increase is much less when the datapath is included: 2% for the routing primitive and 43% for the arbitration primitive. This area estimates of the baseline primitives with an 8-bit datapath to the layout-level areas obtained in an earlier evaluation are within 16% of each other, which indicates that this area estimates give a reasonable picture of area overheads.

TABLE 1

Area comparison in square microns for pre-layout mapped cells with a packing factor of 0.8

| Node Type | Version | Included Components | New Implementations (8-bit) | (32-bit) |
|---|---|---|---|---|
| Routing | baseline | total | 351.4 | 825.6 |
| | | control only | 193.3 | 193.3 |
| | new, root | total | 370.4 | 844.6 |
| | | control only | 212.4 | 212.4 |
| | new, typical | total | 368.3 | 842.5 |
| | | control only | 210.3 | 210.3 |

TABLE 1-continued

Area comparison in square microns for pre-layout mapped cells with a packing factor of 0.8

| Node Type | Version | Included Components | New Implementations (8-bit) | (32-bit) |
|---|---|---|---|---|
| Arbitration | baseline | total | 302.7 | 726.1 |
| | | control only | 161.1 | 161.6 |
| | new (bi-modal) | total | 810.0 | 1040.1 |
| | | control only | 498.1 | 498.1 |
| | | policy | 151.0 | 151.0 |
| | | safety (x2) | 310.4 | 310.4 |

The performance of the bi-modal asynchronous primitives has some small overhead compared to the basic arbitration primitives. Latency is the time from a request transition arriving on an input channel of an empty primitive to the time that the primitive produces a request on its output. Maximum throughput in Giga-flits per second (GFPS) is evaluated under different traffic patterns. In order to capture the interactions between neighboring nodes, throughput is measured at the root primitive of a 3-level fan-out or fan-in tree.

Table 2 shows results of latency and throughput experiments for the modified routing primitive (e.g., routing nodes 800 or 900) under two routing patterns: single and alternating. The single traffic pattern routes data along only one of the routing primitive's output ports while the alternating traffic pattern routes data along each of the routing primitive's output ports in a strictly alternating pattern. No latency overhead was observed for the modified routing nodes, in either root or non-root versions. Only small throughput overhead was observed for the modified routing primitive under both the single and alternating traffic patterns, due to the added load of the monitor control.

TABLE 2

Routing Primitive: Performance

| Node Type | Latency (ps) | Max. Throughput (GFPS) Single | Alternating |
|---|---|---|---|
| Baseline | 307 | 1.73 | 2.01 |
| New | 307 | 1.66 | 1.98 |

Table 3 shows the results of performance experiments for the bi-modal arbitration primitive under two steady-state traffic patterns: single (i.e., packets arrive at a single port) and all (i.e., packets arrive at both ports). The table also compares the performance of the bi-modal arbitration primitive in its two modes: the default-arbitration (default) mode and the biased-input (biased) mode. When the bi-modal arbitrary primitive is in the default mode, it has a small latency and throughput overhead, due to the added Req-Latch control logic. However, in the biased mode, it shows significant improvement over the baseline node: 41.6% lower latency and 19.8% higher throughput. Since the bi-modal arbitration primitive switches out of the biased mode under traffic on both ports, the all traffic pattern is not reported for the biased mode.

TABLE 3

Arbitration Primitive: Performance

| Node Type | Operating Mode | Latency (PS) | Max. Throughput (GFPS) Singe | All |
|---|---|---|---|---|
| Baseline | N/A | 365 | 1.21 | 2.41 |
| New | Default | 396 | 1.19 | 2.40 |
|  | Biased | 214 | 1.45 | N/A |

Table 4 illustrates the performance of the monitoring signals, as they advance through a single node. For the root routing primitive, the latency is measured from the time that a new request arrives until the time that something-coming-out is asserted, while for all other primitives it is the time between something-coming-in and something-coming-out. The de-assertion delay for the monitoring signal for all primitives is measured from the time that an acknowledge from the successor stage arrives until the time that something-coming-out de-asserts. Overall, except for the root routing node, the latencies are quite low—i.e., under 173 picoseconds (ps).

TABLE 4

Monitor Latency: Cell Level

| Node Type | Version | Transition Type | Latency (ps) |
|---|---|---|---|
| Routing Primitive | Root | 0→1 | 441 |
|  |  | 1→0 | 158 |
|  | Typical | 0→1 | 159 |
|  |  | 1→0 | 36 |
| Arbitration Primitive | N/A | 0→1 | 37 |
|  | N/A | 1→0 | 173 |

Table 5 evaluates the mode changes for the bi-modal arbitration primitive. The latency is the delay between the arrival of a request that triggers the mode change and the production of a new request at the output of the primitive. Reconfiguration time is measured from the arrival of a request until all control modules have been reconfigured. In each case, node reconfiguration required at most 338 ps. Interestingly, a mode change from default to biased modes has no latency overhead, compared to the biased mode latency, because reconfiguration takes place in parallel to processing the flit. In contrast, mode changes from biased to default mode does incur overhead: the incoming flit is stalled while reconfiguration takes place.

TABLE 5

Mode Change Evaluation

| Mode Change Type | Scenario | Latency (ps) | Reconfig. Time (ps) |
|---|---|---|---|
| Default→ Biased | N/A | 396 | 309 |
| Biased → Default | Type A | 734 | 338 |
|  | Type B | 578 | 202 |

The system-level performance was also evaluated using a new 8-terminal asynchronous network with dynamic adaptability and the results were compared to the results obtained using an 8-terminal asynchronous network using the basic asynchronous primitives.

Two 8-terminal MoT networks were modeled in structural Verilog using ARM 90 nm standard cells. Each network consists of eight 3-level fan-out trees connected to eight 3-level fan-in trees, for a total of 112 asynchronous nodes. The test environment was written in the C programming language and invoked using a customized Verilog programming language interface (PLI) setup, which provides inputs and records outputs in three phases: warm-up, measurement and drain. The input environment generates packets at random intervals that follow an exponential distribution such that the mean Giga-flits per second (GFPS) equals to the desired input traffic rate. Packet source queues are installed at network input ports for accurate recording of latency.

To ensure accuracy of results, simulations were run with a long enough warm-up and measurement phase such that the system can reach the steady state conditions. To determine the proper simulation time, the standard procedure of comparing a simulation of some warm-up and measurement phase to another simulation with the periods doubled and checking that the results are comparable, was followed. Since different benchmarks inherently require different amounts of time to stabilize to steady state, benchmarks simulation times vary between 1000 nanoseconds (ns) to 5000 ns.

Experiments are conducted for eight synthetic benchmarks chosen to represent a wide range of network conditions. They are: (1) a bit permutation benchmark that uses a "shuffle" to choose source-destination pairs; (2) a digit permutation benchmark that uses a "tornado" pattern to choose source-destination pairs; (3) a uniform random traffic in which each source is equally likely to send a flit to every destination; (4) a simple alternation with overlap in which each source alternates between exactly two destinations, and each destination has contention between exactly two sources; (5) a random restricted broadcast with partial overlap, in which four sources randomly send to three destinations each, where four of the destinations experience contention and four have no contention; (6) a Hotspot benchmark in which one destination receives contending packets from every source; (7) a random single source broadcast sends uniform random data from one source to all destinations; and (8) a partial streaming in which six sources each sends statically to a unique distinct destination, where each of these six destinations is randomly interrupted from one of two remaining sources.

Since the bi-modal arbitration primitive lowers latency in contention-free scenarios, the benchmarks which offer the most contention are the most adversarial. Benchmarks 3 and 6 were picked to be extremely adversarial, benchmarks 4, 5, and 8 were designed to be moderately adversarial, and benchmarks 1, 2, and 7 have the least contention and were the least adversarial.

Overall, latency benefits were seen in six of the eight benchmarks, ranging up to 19.81%. For the remaining two adversarial benchmarks (3 and 6) there were latency overheads up to 13.20%. For saturation throughput, benefits were seen in seven of the eight benchmarks, ranging up to 27.84%. For the remaining single adversarial benchmark (3), there are throughput overheads up to 5.88%. The main cause for these differences is the high level of contention in benchmarks 3 and 6. In particular, detailed simulations of benchmark 6 show that changes from default to biased mode are often soon followed by mode changes back to default. It is expected that a change in the policy mode to detect such thrashing scenarios could mitigate the overhead.

Figure 10:
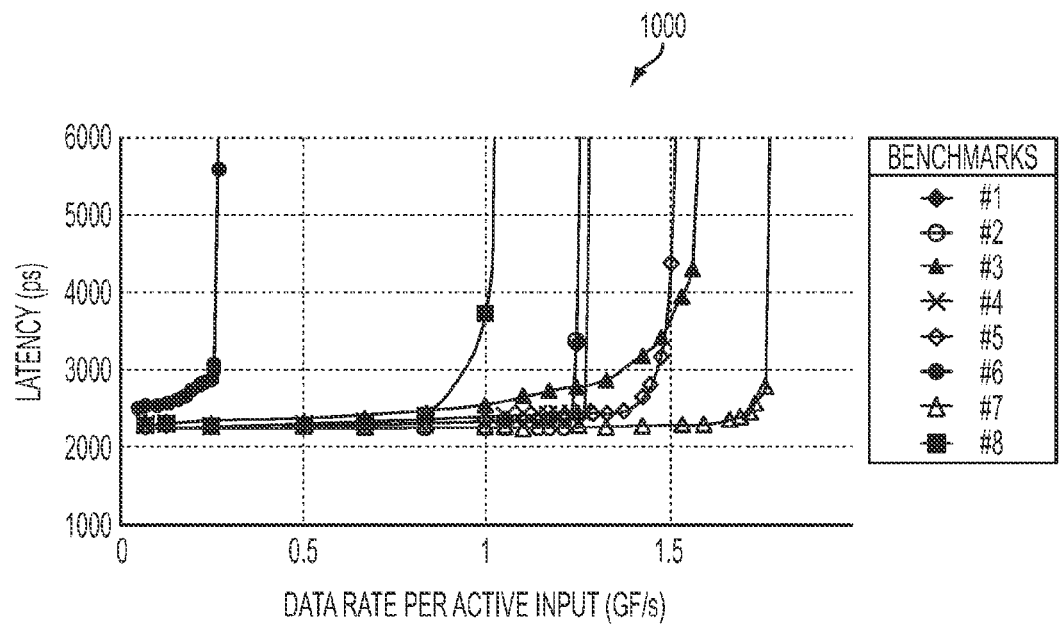
FIG. 10 is a graph illustrating latency results of performance evaluation of a baseline network including basic asynchronous arbitration nodes in accordance with some embodiments of the disclosed subject matter.
Figure 11:
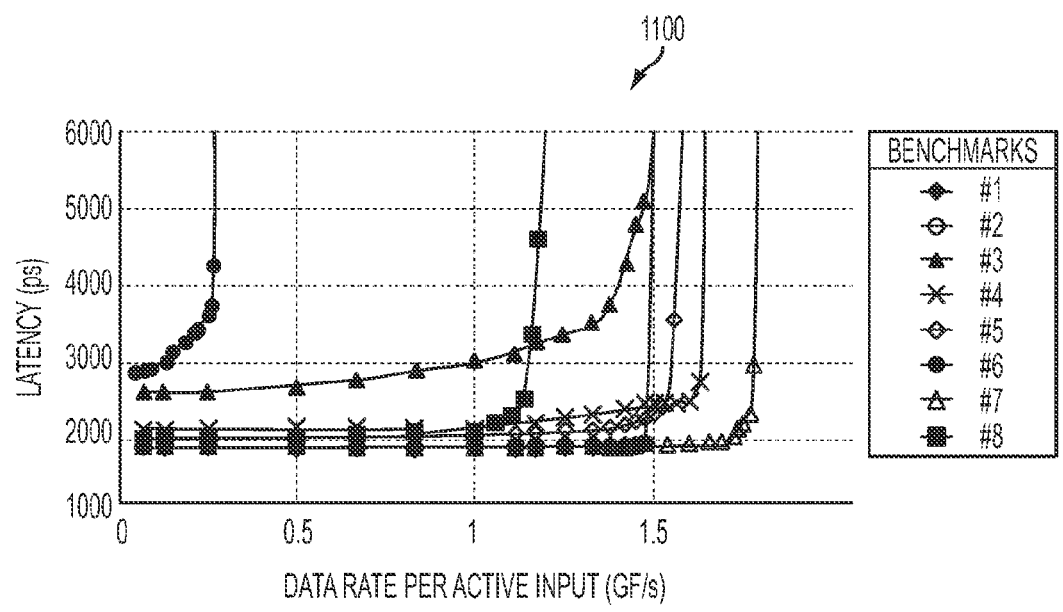
FIG. 11 is a graph illustrating latency results of performance evaluation of an adaptive network including dynamically reconfigurable bi-modal asynchronous arbitration nodes in accordance with some embodiments of the disclosed subject matter.

FIG. 10 is a graph 1000 illustrating latency results of performance evaluation of a baseline network including basic asynchronous arbitration nodes in accordance with some embodiments of the disclosed subject matter. FIG. 11 is a graph 1100 illustrating latency results of performance evaluation of an adaptive network including bi-modal asynchronous arbitration nodes in accordance with some embodiments of the disclosed subject matter. The results 1000 and 11000 are plotted as the network-level latency for each flit versus the mean offered throughput rate. Under lightly-loaded traffic conditions, network-level latency in the baseline network is near 2200 ps for every benchmark. For the adaptive network, latency varies from about 1800 ps under low-contention benchmarks to 2800 ps for adversarial benchmarks.

Figure 12:
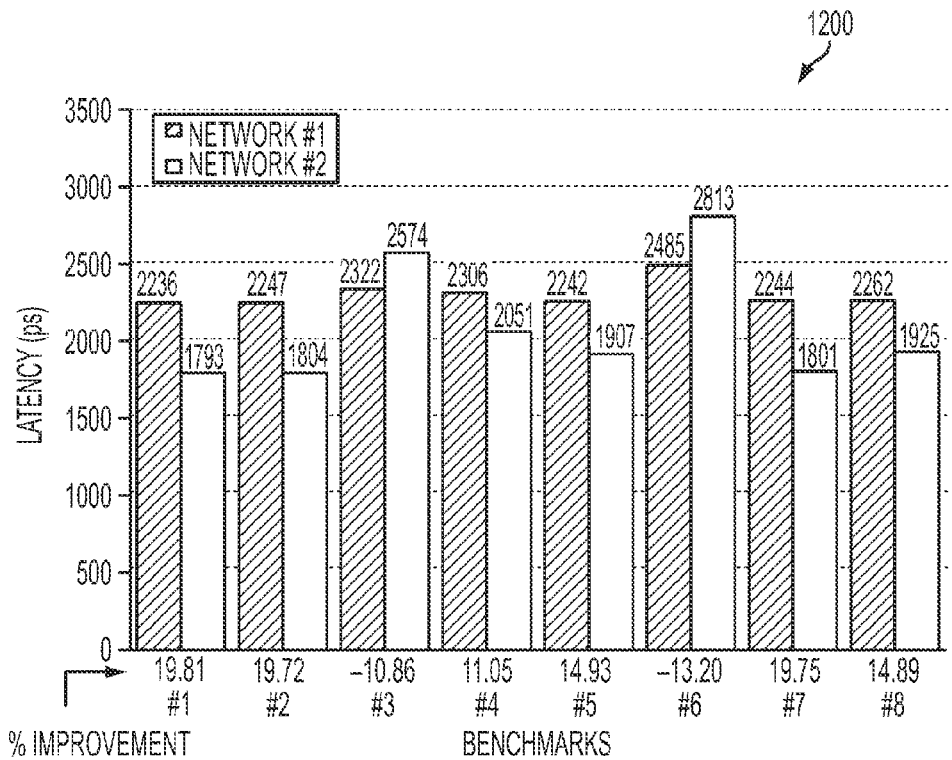
FIG. 12 is a graph illustrating a combined view of the latency results of the baseline network illustrated in FIG. 10 and the latency results of the adaptive network illustrated in FIG. 11 in accordance with some embodiments of the disclosed subject matter.

FIG. 12 is a graph 1200 illustrating a combined view of the latency results of the baseline network (Network No. 1) illustrated in FIG. 10 and the latency results of the adaptive network (Network No. 2) illustrated in FIG. 11 in accordance with some embodiments of the disclosed subject matter. FIG. 12 highlights the differences in these two latency results by showing the latencies of both networks at identical throughput rates. Specifically, an offered traffic rate that is 25% of the saturation throughput was chosen when run on Network No. 1 and then experiments were run on Network No. 2 at that same rate. The 25% rate was chosen because it is high enough to show the characteristics of the benchmarks while still allowing flits to travel through an uncongested network, as is standard when measuring latency.

Evaluation was also performed at an offered traffic rate that is 50% of the saturation throughput, and latency results were not significantly different. Only benchmarks 3 and 6, which were chosen to be the most adversarial, display latency overheads of 10.86% and 13.20%, respectively. The remaining six benchmarks all show significant latency improvements, ranging from 11.05% to 19.81%.

Figure 13:
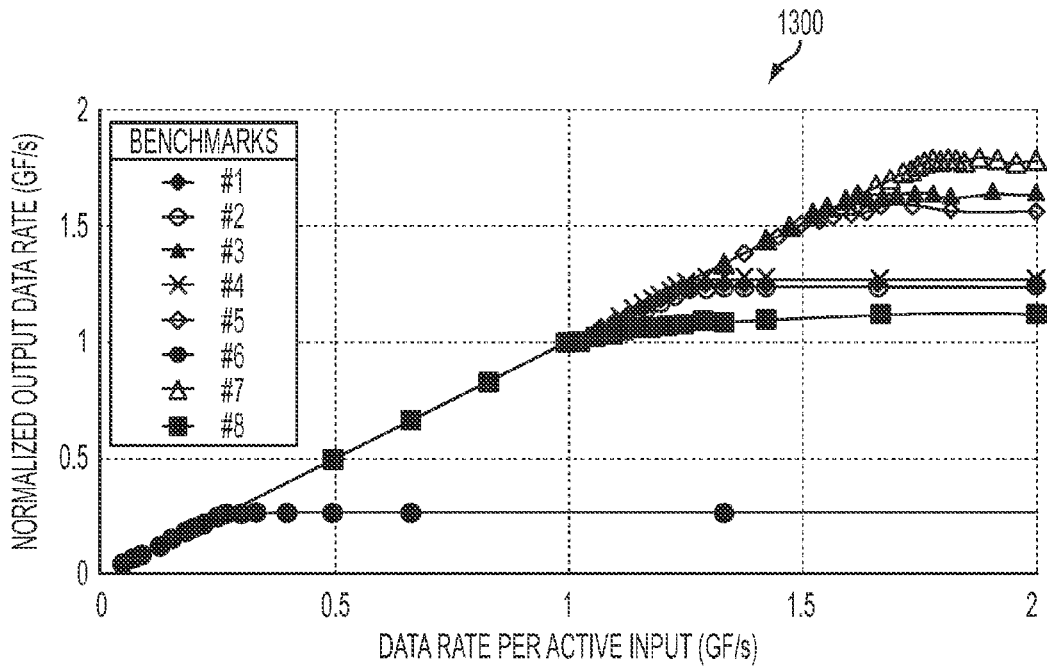
FIG. 13 is a graph illustrating network-level throughput results for a baseline network including basic asynchronous arbitration nodes in accordance with some embodiments of the disclosed subject matter.
Figure 14:
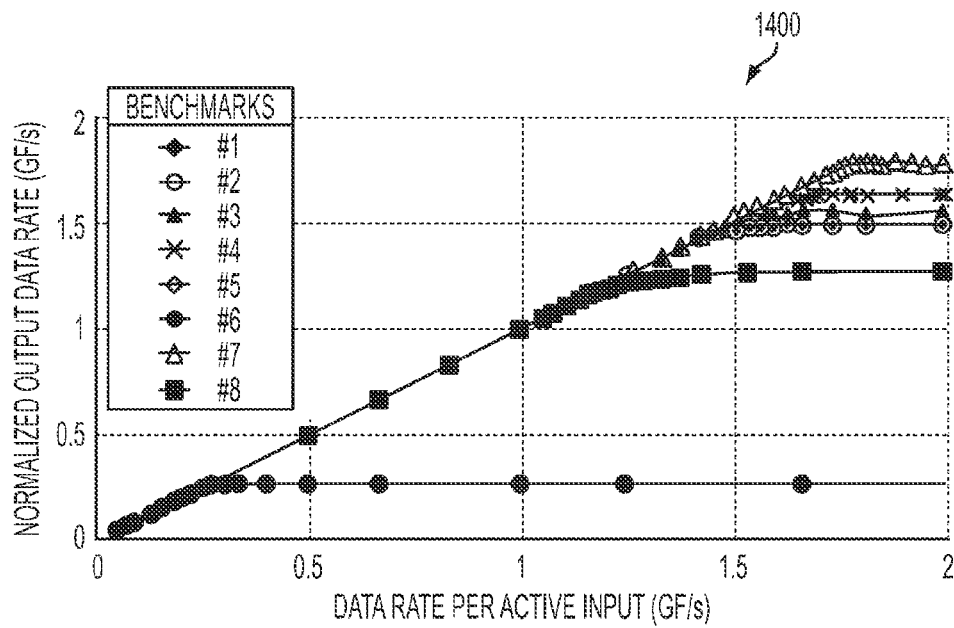
FIG. 14 is a graph illustrating network-level throughput results for an adaptive network including dynamically reconfigurable bi-modal asynchronous arbitration nodes in accordance with some embodiments of the disclosed subject matter.

FIG. 13 is a graph 1300 illustrating a network-level throughput results for a baseline network (Network No. 1) including basic asynchronous arbitration nodes in accordance with some embodiments of the disclosed subject matter. FIG. 14 is a graph 1400 illustrating a network-level throughput results for an adaptive network (Network No. 2) including bi-modal asynchronous arbitration nodes in accordance with some embodiments of the disclosed subject matter. The throughput results are plotted as the output rate normalized to the number of active input sources versus the mean offered throughput rate for each active source. When lightly loaded, the performance of Network No. 2 tracks the performance of Network No. 1 for all benchmarks. At some offered throughput rate, the throughput results for every benchmark levels off to a value known as the saturation throughput.

Figure 15:
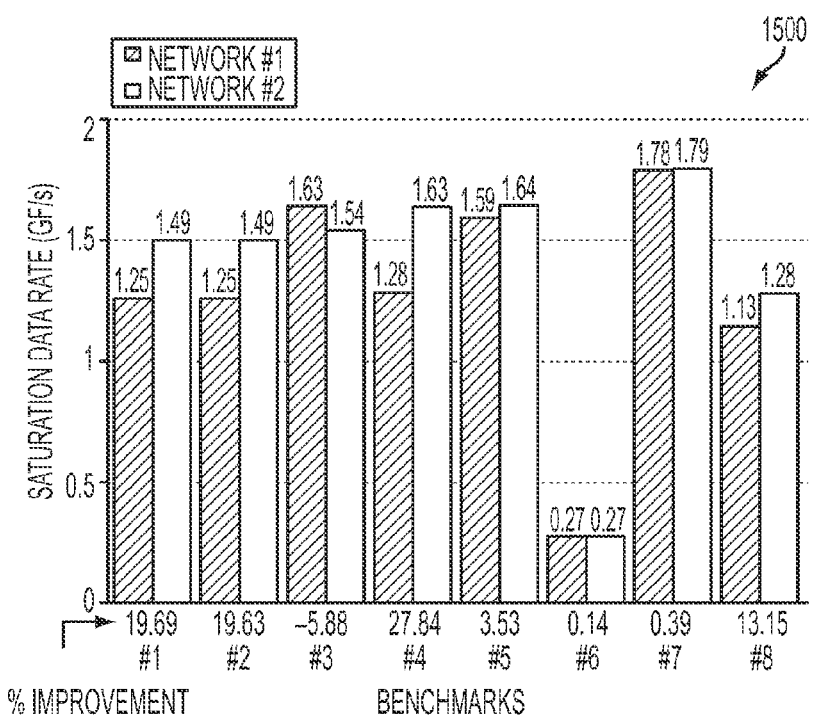
FIG. 15 is a graph illustrating a combined view of the throughput results for the baseline network illustrated in FIG. 13 and the throughput results for the adaptive network illustrated in FIG. 14 in accordance with some embodiments of the disclosed subject matter.

FIG. 15 is a graph 1500 illustrating the throughput results for the baseline network illustrated in FIG. 13 and the throughput results for the adaptive network illustrated in FIG. 14 in accordance with some embodiments of the disclosed subject matter. FIG. 15 highlights the differences in saturation throughput values between the two networks. Of the two adversarial benchmarks, benchmark 6 still showed slight improvements, while benchmark 3 shows only a 5.88% throughput overhead. The remaining six benchmarks show throughput improvements from 0.39% to 27.84%.

The lightweight monitoring network is used to find a safe time window for a mode change from the biased-input mode (biased) to the default-arbitration mode (default). As an example, if a bi-modal arbitration node is in biased-to-0 mode, its L1 latch (shown as input request latch 412a in FIG. 4) is transparent. During the mode change to default, latch L1 becomes opaque. If L1 becomes opaque just as a new flit is arriving on input channel 0, a malfunction may occur. The monitoring network solves this problem by enabling the node to decide whether it is safe to immediately perform a mode change if nothing is coming on channel 0 ("Type A" scenario), or if it must wait to piggy-back the change on the next arriving flit on channel 0 ("Type B" scenario).

A race condition occurs when nothing appears to be coming on channel 0, thereby initiating a Type A mode change, and then a new flit is immediately detected as coming on channel 0. In this case, there are two critical global paths to the target arbitration node: (i) the new flit, traversing from the entrance to network (root routing node) to the node's input channel, and (ii) the monitoring signal, traversing the same route. If the monitoring signal, something-coming-in-0, is asserted high just after the flit on channel 0 has initiated the mode change to default (i.e., initbias0 is de-asserted, or set to, low), then a Type-A change will occur. The timing constraint is between (a) the differential between the arrivals of the global monitoring signal and the corresponding flit on channel 0, which must always be longer than (b) the local path to cut off channel 0, i.e. from setting initbias0 to low in order to request latch L1 to become opaque.

Table 6 shows the timing margins for (a) that constitute the first part of the timing constraint. This is relevant only for Type-A mode changes from biased to default mode. All other mode change types have local timing constraints only. The smallest timing margin, 404 ps, is to a target arbitration leaf node, which is closest to the entrance to the network. The greatest timing margin is to a target arbitration root node, which is farthest from the entrance to the network. The margin depends on whether the intermediate arbitration nodes on the path are in default mode, 1122 ps, or biased mode, 754 ps.

TABLE 6

Monitoring Network Latency

| Scenario | Operating Mode | Monitoring Latency (ps) | Flit Latency (ps) | Margin (ps) |
| --- | --- | --- | --- | --- |
| Reqin→Fan-in Leaf | N/A | 586 | 989 | 404 |
| Reqin→Fan-in Root | Default | 702 | 1823 | 1122 |
| Reqin→Fan-in Root | Biased | 702 | 1455 | 754 |

For (b), which forms the second part of the constraint, the local path to make L1 opaque includes a mutex element (see e.g., Type A Mode Change block 606A in FIG. 6A). The entire timing constraint between (a) and (b) is easily met with a 235 ps margin in almost all cases, when competing input arrivals to the Type A mutex are not extremely close. If the mutex inputs arrive within 2 ps, the margin becomes 136 ps. However, as the differential between the input arrivals at the Type A mutex become less than 1 ps, the mutex delay may lead to an unsatisfied constraint in rare cases. These cases not only require this narrow differential, but can only occur with the precise scenario above of activation of a Type A mode change. The mean time between failure (MTBF) for this rare case has been evaluated and found to be negligible in most cases. Nevertheless, the timing constraints having a MTBF can be entirely eliminated by making relatively minor changes (shown in Type A Mode Change block 606B in FIG. 6B when compared to Type A Mode Change block 606A in FIG. 6A) to the safety module design and protocol.

Although the disclosed subject matter has been described and illustrated in the foregoing illustrative embodiments, it is understood that the present disclosure has been made only by way of example, and that numerous changes in the details of implementation of the disclosed subject matter can be made without departing from the spirit and scope of the disclosed subject matter, which is only limited by the claims which follow. Features of the disclosed embodiments can be combined and rearranged in various ways.

What is claimed is:

1. A dynamically reconfigurable asynchronous arbitration node for use in an adaptive asynchronous interconnection network, comprising:
    at least one output channel and a plurality of input channels, including a first input channel and a second input channel; and
    a circuit supporting a plurality of operating modes for the arbitration node including a default-arbitration mode and a biased-input mode, wherein the circuit is configured to:
    generate data for the at least one output channel by:
        mediating amongst input traffic including data received at the first input channel and data received at the second input channel, if the arbitration node is operating in the default-arbitration mode; and
        providing a direct path to the at least one output channel for one of the first input channel and the second input channel that is biased, if the arbitration node is operating in the biased-input mode;
    monitor the input traffic and initiate a mode change for the arbitration node based at least in part on a recent history of the observed input traffic in accordance with a mode-change policy, the recent history comprising at least two successive inputs from one of the first and second input channels; and
    implement the mode change by:
        reconfiguring the arbitration node from the default-arbitration mode to the biased-input mode for operating in the biased-input mode, if the mode change is from the default-arbitration mode to the biased-input mode; and
        determining a safe time window and reconfiguring the arbitration node within the safe time window from the biased-input mode to the default arbitration mode for operating in the default-arbitration mode, if the mode change is from the biased-input mode to the default-arbitration mode and no data is about to arrive at the biased input channel.

2. The arbitration node of claim 1, wherein if the mode change is from the biased-input mode to the default-arbitration mode and data is about to arrive at the biased input channel, the circuit is further configured to implement the mode change by receiving the data at the biased input channel and processing the data before determining a safe time window and reconfiguring the arbitration node within the safe time window from the biased input mode to the default-arbitration mode for operating in the default-arbitration mode.

3. The arbitration node of claim 1, further comprising a network-monitoring module in communication with the circuit, wherein the network-monitoring module includes a plurality of input ports, including a first input port and a second input port, and at least one output port, and is configured to support determining the safe time window by monitoring the input ports for an advance notification signal indicating whether an arrival of data at the biased input channel is imminent and alerting the circuit of the pending arrival, wherein the advance notification signal includes an incoming-data (IND) signal and a no-incoming-data (NIND) signal and wherein the advance notification signal for the first input channel is received at the first input port and the advance notification signal for the second input channel is received at the second input port.

4. The arbitration node of claim 3, wherein the network-monitoring module is further configured to pass the advance notification signal to the at least one output port for further propagation of the advance notification signal to a next network monitoring module in a next dynamically reconfigurable asynchronous arbitration node located downstream in the adaptive asynchronous interconnection network.

5. The arbitration node of claim 3, wherein the arbitration node is operating in the biased-input mode and wherein:
    if the network-monitoring module receives at an input port for the biased input channel a NIND signal, the circuit is further configured to perform a mode change operation to change modes from the input-biased mode to the default-arbitration mode for the arbitration node, wherein the mode change operations comprise at least two parts, and wherein the first part of the mode change operation includes one or more circuit operations and wherein the mode change operation is performed with no timing constraints having a mean-time-between-failure (MTBF).

6. The arbitration node of claim 5, wherein:
    if the network-monitoring module receives at the input port for the biased input channel an IND signal subsequent to receiving the NIND signal, the circuit is further configured to reverse the first part of the mode change operation for a continued operation of the arbitration node in the biased-input mode.

7. The arbitration node of claim 1, wherein the adaptive asynchronous interconnection network includes a mesh-of-trees network.

8. The arbitration node of claim 1, wherein the mode-change policy is reconfigurable.

9. The arbitration node of claim 1, wherein the reconfiguration of the arbitration node from the default-arbitration mode to the biased-input mode for operating in the biased-input mode and processing of data received at the biased input channel occur concurrently, wherein the processing of the data includes forwarding the data directly to the at least one output channel.

10. The arbitration node of claim 1, wherein the circuit comprises an arbitration module, a policy module and a safety module and wherein the arbitration module is configured to generate the data for the output channel, the policy module is configured to monitor the input traffic and initiate the mode change, and the safety module is configured to implement the mode change.

11. The arbitration node of claim 10, wherein the safety module includes a burst mode asynchronous controller.

12. The arbitration node of claim 10, wherein the safety module includes a safety circuit unit for each of the first and second input channels.

13. The arbitration node of claim 1, wherein the mode-change policy requires the circuit to reconfigure the arbitration node from the default-arbitration mode to the biased input mode if the circuit observes that a predetermined number of successive instances of data from one of the first and second input channels is successively processed and wherein the predetermined number is modified.

14. The arbitration node of claim 1, wherein the mode-change policy requires the circuit to reconfigure the arbitration node from the biased-input mode to the default arbitration mode if an instance of data arrives in the non-biased input channel.

15. A method for a dynamically reconfigurable asynchronous arbitration node supporting a plurality of operating modes including a default-arbitration mode and a biased input mode in an adaptive asynchronous interconnection network, comprising:
  generating data for at least one output channel of the arbitration node by:
    mediating amongst input traffic including data received at a plurality of input channels of the arbitration node, including data received at a first input channel and data received at a second input channel, if the arbitration node is operating in the default arbitration mode; and
    providing a direct path to the at least one output channel for one of the first input channel and the second input channel that is biased, if the arbitration node is operating in the biased-input mode;
  monitoring the input traffic and initiating a mode change for the arbitration node based at least in part on a recent history of the observed input traffic in accordance with a mode-change policy, the recent history comprising at least two successive inputs from one of the first and second input channels; and
  implementing the mode change by:
    reconfiguring the arbitration node from the default-arbitration mode to the biased-input mode for operating in the biased-input mode, if the mode change is from the default-arbitration mode to the biased-input mode; and
    determining a safe time window and reconfiguring the arbitration node within the safe time window from the biased-input mode to the default-arbitration mode for operating in the default-arbitration mode, if the mode change is from the biased-input mode to the default-arbitration mode and no data is about to arrive at the biased input channel.

16. The method of claim 15, wherein if the mode change is from the biased-input mode to the default-arbitration mode and data is about to arrive at the biased input channel, the method further includes implementing the mode change by receiving the data at the biased input channel and processing the data before determining a safe time window and reconfiguring the arbitration node within the safe time window from the biased-input mode to the default-arbitration mode for operating in the default-arbitration mode.

17. The method of claim 15, further comprising monitoring the adaptive asynchronous interconnection network at a network-monitoring module for an advance notification signal indicating whether an arrival of data at the biased input channel is imminent and alerting the arbitration node of the pending arrival, wherein an advance notification signal for the first input channel of the arbitration node is received at a first input port of the network-monitoring module and an advanced notification signal for the second channel of the arbitration node is received at a second input port of the network-monitoring module.

18. The method of claim 17, further comprising receiving the advance notification signal at the network-monitoring module from another network-monitoring module located upstream of the asynchronous interconnection network, wherein the another network monitoring module is in communication with one of another dynamically reconfigurable asynchronous arbitration node or an asynchronous routing node located upstream of the asynchronous interconnection network.

19. The method of claim 17, further comprising propagating the advance notification signal to a next network-monitoring module located downstream of the asynchronous interconnection network, wherein the next network-monitoring module is in communication with a next dynamically reconfigurable asynchronous arbitration node.

20. A configurable network-monitoring module for use in an adaptive asynchronous interconnection network of a variant mesh-of-trees (MoT) topology, comprising:
  a control circuit; and
  one or more input ports and one or more output ports, wherein:
    if the network-monitoring module is coupled to and configured for an asynchronous root routing node, the control circuit is configured to send an advance notification signal through a signal path connecting one of the one or more output ports of the network-monitoring module with an input port of a next network-monitoring module coupled to an asynchronous non-root routing node that is located downstream of the interconnection network from the root routing node, when data enters the interconnection network from a source to an input channel of the root routing node, wherein the advance notification signal reaches a plurality of nodes located downstream including the non-root routing node before the data does and alert the plurality of nodes of a pending arrival of the data;
    if the network-monitoring module is coupled to and configured for an asynchronous non-root routing node, the control circuit is configured to:
      receive at one of the one or more input ports an advance notification signal from another network-monitoring module coupled to one of an asynchronous root routing node or another asynchronous non-root routing node that is located upstream of the interconnection network from the non-root routing node, the advance notification signal indicating a pending arrival of data at an input channel of the non-root routing node;
      alert the non-root routing node of the pending arrival of the data; and
      forward the advance notification signal through a signal path connecting one of the one or more output ports of the network-monitoring module with an input port of a next network-monitoring module coupled to one of another asynchronous non-root routing node or an asynchronous non-root leaf routing node that is downstream of the interconnection network from the non-root routing node,
    wherein the advance notification signal reaches one or more nodes located downstream including the one of the another asynchronous non-root routing node or the asynchronous non-root leaf routing node before the data does and alert the one or more downstream nodes of the pending arrival of the data;
    if the network-monitoring module is coupled to and configured for an asynchronous non-root arbitration node, the control circuit is configured to:
      receive at one of the one or more input ports an advance notification signal from another network-monitoring module coupled to one of an asynchronous non-root leaf arbitration node or another asynchronous non-root arbitration node that is upstream of the interconnection network from the non-root arbitration node, the advance notification signal indicating a pending arrival of data at an input channel of the non-root arbitration node;

alert the non-root arbitration node of the pending arrival of the data; and forward the advance notification signal through a signal path connecting one of the one or more output ports of the network monitoring module with an input port of a next network-monitoring module coupled to one of another asynchronous non-root arbitration node or an asynchronous root arbitration node that is downstream of the interconnection network from the non-root arbitration node, wherein the advance notification signal reaches one or more nodes located downstream including the one of the another asynchronous non-root arbitration node or the asynchronous root arbitration node before the data does and alert the one or more downstream nodes of the pending arrival of the data; and if the network-monitoring module is coupled to and configured for an asynchronous root arbitration node, the control circuit is configured to receive at one of the one or more input ports an advance notification signal from another network-monitoring module coupled to an asynchronous non-root arbitration node that is upstream of the interconnection network from the root arbitration node, the advance notification signal indicating an impending arrival of data at an input channel of the root arbitration node and alert the root arbitration node of the impending arrival of the data, wherein the adaptive asynchronous interconnection network includes an asynchronous arbitration node supporting a plurality of operating modes including a default-arbitration mode and a biased-input mode, the asynchronous arbitration node being configured to monitor the input traffic and initiate a mode change for the arbitration node based at least in part on a recent history of the observed input traffic in accordance with a mode-change policy, the recent history comprising at least two successive inputs from one of the first and second input channels, and wherein the asynchronous arbitration node uses the alert from the control circuit to safely complete the mode change.

21. The arbitration node of claim 1, wherein initiation of a mode change for the arbitration node is based solely on a recent history of the observed input traffic.

22. The arbitration node of claim 1, wherein initiation of a mode change for the arbitration node is independent from the state of adjacent arbitration nodes.

23. The method of claim 15, wherein initiation of a mode change for the arbitration node is based solely on a recent history of the observed input traffic.

24. The method of claim 15, wherein initiation of a mode change for the arbitration node is independent from the state of adjacent arbitration nodes.

25. The module of claim 20, wherein initiation of a mode change for the arbitration node is based solely on a recent history of the observed input traffic.

26. The module of claim 20, wherein initiation of a mode change for the arbitration node is independent from the state of adjacent arbitration nodes.

* * * * *

UNITED STATES PATENT AND TRADEMARK OFFICE
CERTIFICATE OF CORRECTION

PATENT NO. : 9,537,679 B2
APPLICATION NO. : 14/004870
DATED : January 3, 2017
INVENTOR(S) : Steven M. Nowick et al.

Page 1 of 1

It is certified that error appears in the above-identified patent and that said Letters Patent is hereby corrected as shown below:

In the Specification

At Column 1, Line number 19, please delete "The government may have certain rights in the present invention pursuant to grants from the NSF award CCF-0811504." and insert --This invention was made with government support under grant number CCF0811504 awarded by the National Science Foundation. The government has certain rights in the invention.--

Signed and Sealed this
Fifteenth Day of May, 2018

Andrei Iancu
*Director of the United States Patent and Trademark Office*